United States Patent
Yoon et al.

(10) Patent No.: US 10,467,613 B2
(45) Date of Patent: Nov. 5, 2019

(54) MOBILE TERMINAL

(71) Applicant: LG Electronics Inc., Seoul (KR)

(72) Inventors: Sunghye Yoon, Seoul (KR); Sooyon Chung, Seoul (KR); Sujin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 783 days.

(21) Appl. No.: 15/131,335

(22) Filed: Apr. 18, 2016

(65) Prior Publication Data
US 2017/0046686 A1   Feb. 16, 2017

Related U.S. Application Data

(60) Provisional application No. 62/204,463, filed on Aug. 13, 2015.

(30) Foreign Application Priority Data

Sep. 18, 2015   (KR) .................. 10-2015-0132687

(51) Int. Cl.
*G06Q 20/22*   (2012.01)
*H04W 4/02*   (2018.01)
(Continued)

(52) U.S. Cl.
CPC ......... *G06Q 20/227* (2013.01); *G06Q 20/325* (2013.01); *G06Q 20/327* (2013.01);
(Continued)

(58) Field of Classification Search
CPC .. G06Q 20/227; G06Q 20/325; G06Q 20/327; H04W 4/025; H04W 8/06; H04W 60/04
(Continued)

(56) References Cited

U.S. PATENT DOCUMENTS 9,092,767 B1 *   7/2015   Andrews .............. G06Q 20/227
9,117,242 B1 *   8/2015   Ellis ....................... G06Q 40/00
(Continued)

FOREIGN PATENT DOCUMENTS

EP          2869610         5/2015
KR   10-2012-0111178       10/2012
(Continued)

OTHER PUBLICATIONS

Wikipedia. "System Architecture Evolution," <URL:https://en.wikipedia.org/w/index/php?title+System_Architecuture_Evolution&oldid+671617291> Jul. 15, 2015, XP055313094, 8 pages.
(Continued)

*Primary Examiner* — Paultep Savusdiphol
(74) *Attorney, Agent, or Firm* — Fish & Richardson P.C.

(57) ABSTRACT

A mobile terminal includes a memory device that is configured to store a plurality of payment methods, a communication unit that is configured to receive network identification information from an accessed communication network, and a controller. The controller is configured to identify, from the received network identification information, a country where the mobile terminal is located based on a communication network identified from the network identification information being a visited network, and output at least one of the plurality of payment methods as an available payment method, the at least one of the plurality of payment methods having a same brand as a card association brand that is accepted in the identified country.

21 Claims, 18 Drawing Sheets

(51) Int. Cl.
*G06Q 20/32* (2012.01)
*H04W 8/06* (2009.01)
*H04W 60/04* (2009.01)

(52) U.S. Cl.
CPC .............. *H04W 4/025* (2013.01); *H04W 8/06* (2013.01); *H04W 60/04* (2013.01)

(58) Field of Classification Search
USPC .................................................. 235/380, 379
See application file for complete search history.

(56) References Cited

U.S. PATENT DOCUMENTS

| | | | | |
|---|---|---|---|---|
| 9,619,792 | B1* | 4/2017 | Aaron | G06Q 20/227 |
| 9,672,511 | B2* | 6/2017 | Lim | G06Q 20/202 |
| 9,679,284 | B2* | 6/2017 | Andrews | G06Q 20/227 |
| 2009/0018923 | A1 | 1/2009 | Chen et al. | |
| 2012/0191603 | A1* | 7/2012 | Nuzzi | G06Q 20/102 705/40 |
| 2012/0232968 | A1 | 9/2012 | Calman | G06Q 30/0207 705/14.4 |
| 2012/0310760 | A1* | 12/2012 | Phillips | G06Q 40/02 705/26.1 |
| 2014/0012704 | A1* | 1/2014 | Mizhen | G06Q 30/06 705/26.41 |
| 2014/0040120 | A1 | 2/2014 | Cho et al. | |
| 2014/0129357 | A1* | 5/2014 | Goodwin | G06Q 30/02 705/16 |
| 2015/0058146 | A1* | 2/2015 | Gaddam | G06Q 20/322 705/21 |
| 2015/0212702 | A1 | 7/2015 | Kim et al. | |
| 2016/0148185 | A1* | 5/2016 | Andrews | G06Q 20/227 705/39 |
| 2016/0162882 | A1* | 6/2016 | McClung, III | G06Q 20/02 705/41 |
| 2016/0192123 | A1* | 6/2016 | Lim | G06Q 20/202 455/41.1 |
| 2016/0307196 | A1* | 10/2016 | Achhra | G06Q 20/401 |
| 2016/0328698 | A1* | 11/2016 | Kumaraguruparan | H04W 4/029 |
| 2018/0114215 | A1* | 4/2018 | Cho | G06Q 20/32 |

FOREIGN PATENT DOCUMENTS

| | | |
|---|---|---|
| KR | 10-1301895 | 8/2013 |
| KR | 10-2015-0007616 | 1/2015 |
| KR | 10-2015-0060631 | 6/2015 |
| KR | 10-1542603 | 8/2015 |

OTHER PUBLICATIONS

Ferraro et al., "Location-Aware Applications," Manning Publications, Jul. 28, 2011, XP055223427, 320 pages.

Coskun et al., "Near Field Communication (NFC): From Theory to Practice," Wiley, Feb. 13, 2012, XP055360224, 262 pages.

Mayes et al., "Smart Cards, Tokens, Security and Applications," Springer US, Jan. 7, 2008, XP055498754, 149 pages.

EP Office Action in European Application No. 16181589.9, dated Aug. 20, 2018, 10 pages.

Wikipedia. "System Architecture Evolution," <URL:https://en.wikipedia.org/w/index.php?title+System_Architecuture_Evolution&oldid+671617291> Jul. 15, 2015, XP055498745, 8 pages.

Extended European Search Report issued in European Application No. 16181589.9 dated Nov. 9, 2016, 10 pages.

Gookin, "Android Phones for Dummies," For Dummies, Apr. 21, 2014, XP055313094, 47 pages.

Leonhard, "LTE, WiMAX and WLAN Network Design, Optimization and Performance Analysis," Aug. 22, 2011, Wiley, XP055313117, 124 pages.

Liebhard et al., "LTE for public safety," Jul. 31, 2015, XP055238726, 127 pages.

Wikipedia, "Mobility management," Jul. 6, 2015, URL: https://en.wikipedia.org/w/index.php?title=Mobility_management&oldid=670199714, XP055313249, 4 pages.

Wikipedia, "Roaming," Jul. 28, 2015, URL: https://en.wikipedia.org/w/index.php?title=Roaming&oldid=673510661, XP055312987, 9 pages.

Summons to Attend Oral Proceedings in European Application No. 16181589.9, dated Apr. 18, 2019, 14 pages.

* cited by examiner

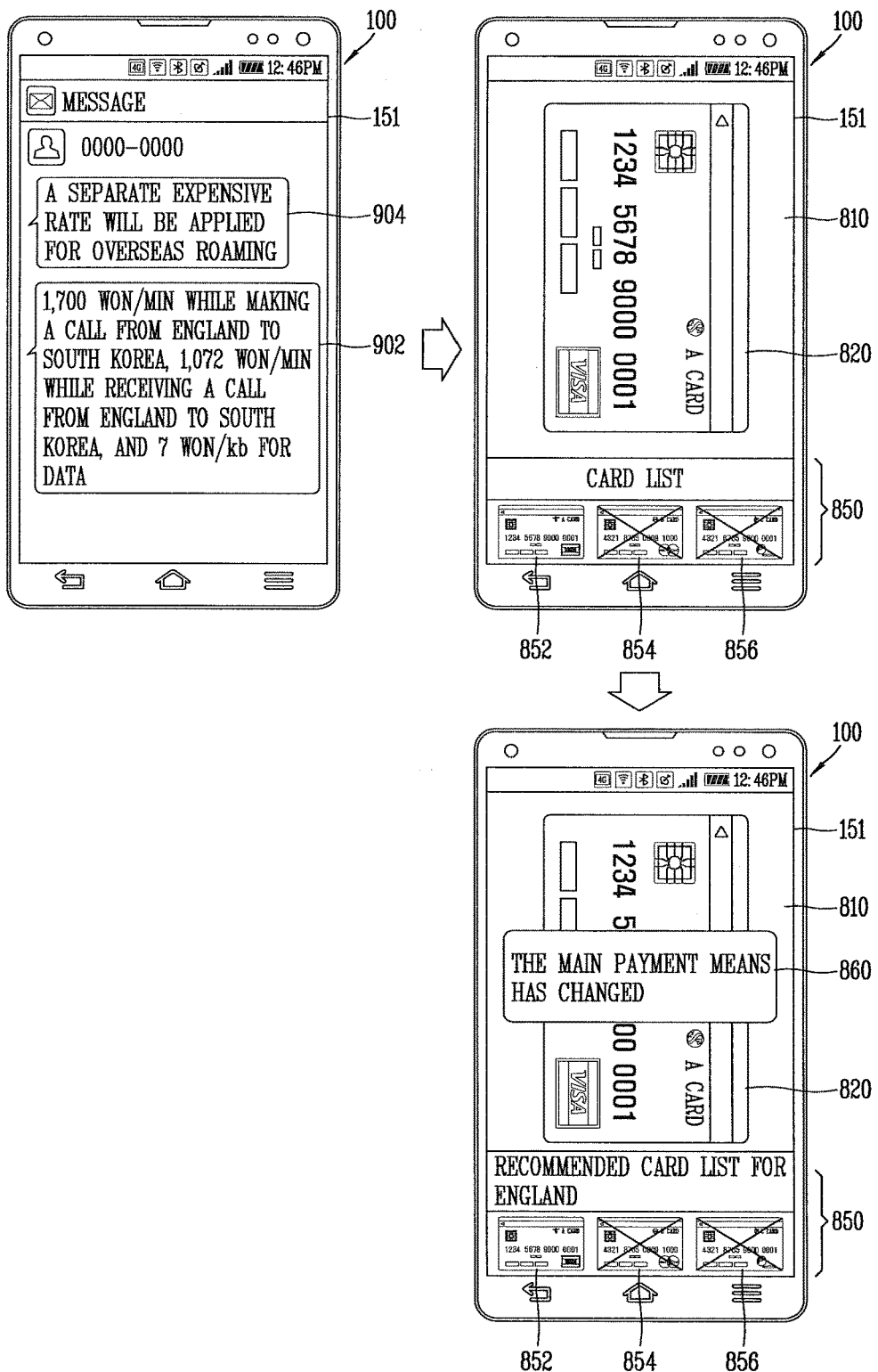

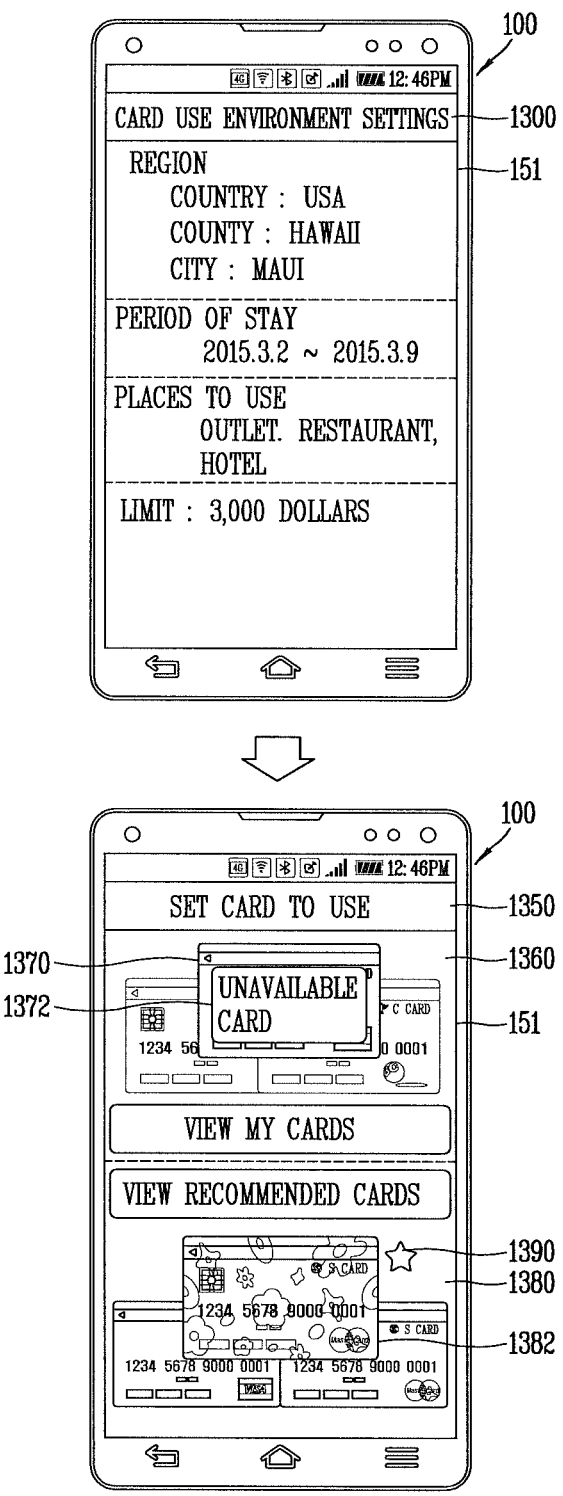

FIG. 14A
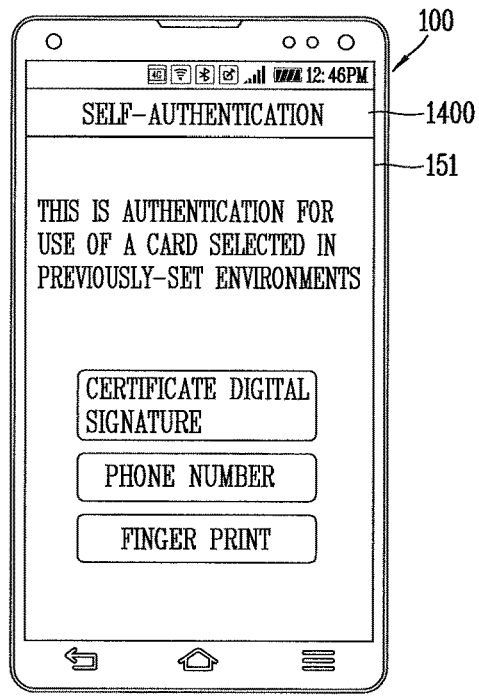
(a)
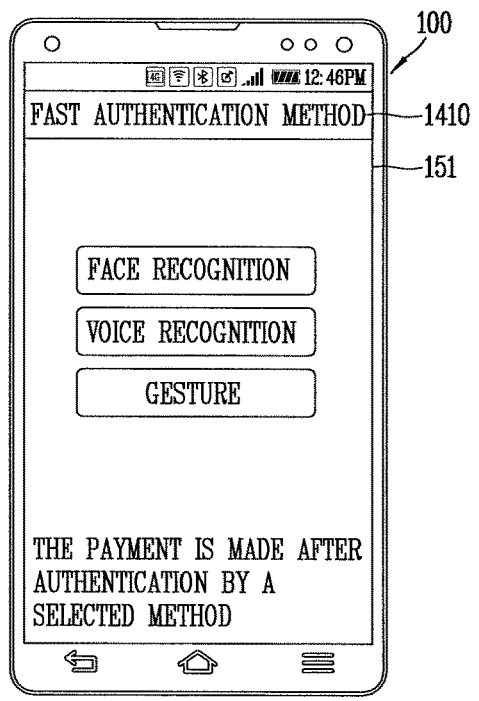
(b)

FIG. 14B
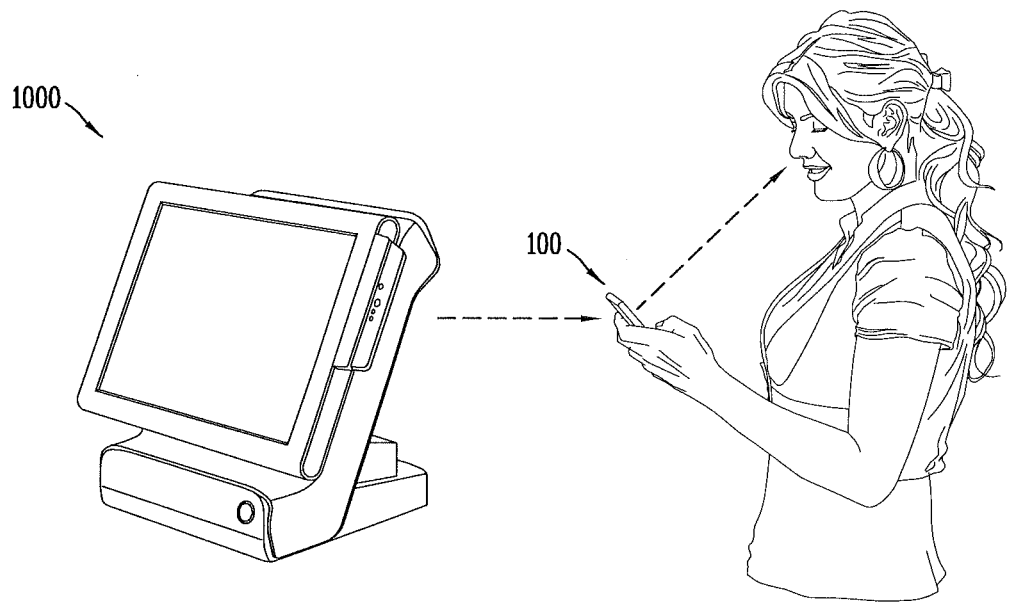
(a)
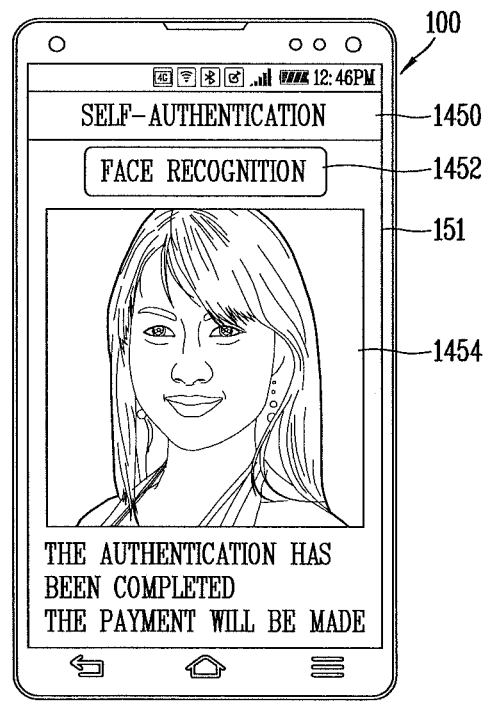
(b)
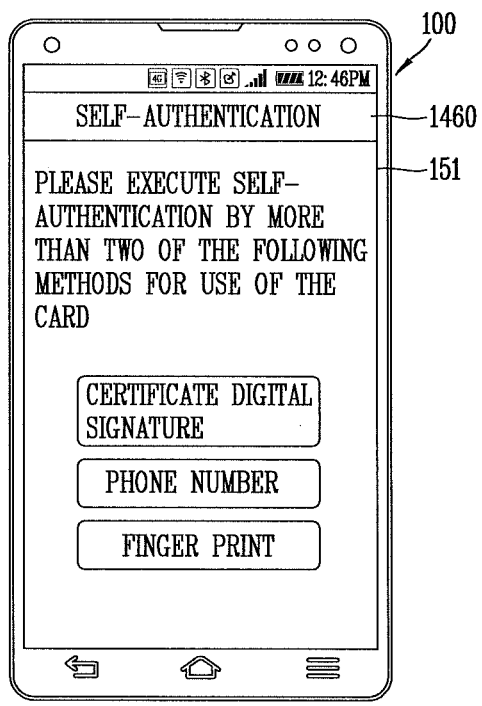
(c)

MOBILE TERMINAL

CROSS-REFERENCE TO RELATED APPLICATION

Pursuant to 35 U.S.C. § 119(a), this application claims the benefit of earlier filing date and right of priority to Korean Application No. 10-2015-0132687, filed on Sep. 18, 2015, and Provisional application No. 62/204,463, filed on Aug. 13, 2015, the contents of which is incorporated by reference herein in its entirety.

FIELD

This specification relates to a mobile terminal having at least one payment method, and a method for controlling the same.

BACKGROUND

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

SUMMARY

According to an innovative aspect of the subject matter described in this application, a mobile terminal includes a memory device that is configured to store a plurality of payment methods; a communication unit that is configured to receive network identification information from an accessed communication network; and a controller that is configured to identify, from the received network identification information, a country where the mobile terminal is located based on a communication network identified from the network identification information being a visited network, and output at least one of the plurality of payment methods as an available payment method, the at least one of the plurality of payment methods having a same brand as a card association brand that is accepted in the identified country.

The mobile terminal may include one or more of the following optional features. The controller is further configured to output, on a display unit of the mobile terminal, service information related to the identified country for each of the plurality of payment methods. The service information includes information related to a clearing commission, a discount rate, and a point accumulation rate for the identified country and for each of the plurality of payment methods. The service information further includes information related to a type of each of the plurality of payment methods. The information related to the type of each of the plurality of payment methods includes information indicating whether the payment method is a credit card or a debit card. The controller is further configured to output account information related to an account linked to the debit card according to a user selection based on the payment method being the debit card. The account information includes bank balance information related to the linked account. The service information further includes event information related to the identified country and benefit information related to an event for each payment method.

The controller is further configured to register, as a main payment method, one of the at least one of the plurality of payment methods according to a preset criterion, the at least one of the plurality of payment methods having a same brand as a card association brand accepted in the identified country, and make a payment via the payment method that is registered as the main payment method, in response to a payment request. The preset criterion is a clearing commission, a discount rate, or a point accumulation rate for a reference amount of spent money. The preset criterion further includes currencies accepted in the identified country and associated exchange rates. The controller is further configured to compare the clearing commission for each payment method based on a currency with a lowest exchange rate among the currencies accepted in the identified country. The controller is further configured to request, from a mobility management entity (MME) of a currently-accessed communication network, information related to card association brands that are accepted in the visited network, and set, as the main payment method, a payment method that has the same brand as a specific card association brand among the plurality of payment methods based on information related to the specific card association brand that is received from the mobility management entity.

The controller is further configured to register at least one additional payment method as a main payment method based on a discount rate, a point accumulation rate, or a clearing commission based on a specific region or a specific amount of money being set, and make a payment via the additional payment method based on a payment-requested region being located within the specific region or based on a total amount of spent money or a payment-requested amount of money being more than the specific amount of money. The controller is further configured to store information related to a main payment method before changing the main payment method according to the registration of the main payment method, and recover the main payment method using the stored information based on a communication network identified from network identification information received through an accessed communication network being a home network. The controller is further configured to identify the country where the mobile terminal is located based on location information acquired from at least one positioning module based on the network identification information being unavailable from the currently-accessed communication network.

The at least one positioning module is a global positioning system (GPS) module, a WiFi module, or at least one peripheral that is configured to connect to the mobile terminal. The controller is further configured to output, as an unavailable payment method, a payment method of the plurality of payment methods that has an expiration date that is within a predetermined period. The controller is further configured to estimate a period of an overseas stay of a user based on information stored in the mobile terminal, and output, as the unavailable payment method, a payment method of the plurality of payment methods that has an expiration date that is during in the estimated period of overseas stay. The information stored in the mobile terminal includes schedule information or airline ticket purchase history information. The controller is further configured to search for an available payment method of the plurality of payment methods according to a preset criterion, and notify a user to an absence of the available payment method by outputting, on a display unit, notification information based on indicator information related to a current state of the mobile terminal being output, based on an image of a preset main payment method being output, or based on a distance between the mobile terminal and a preset peripheral being within a predetermined distance.

The controller is further configured to output information related to an issue of another payment method based on there being no available payment methods in the plurality of payment methods. The information related to the issue of the other payment method includes information related to at least one payment method having the same brand as a card association brand that is accepted in a country where the mobile terminal is located or a visited network that the mobile terminal is currently accessing, service information that includes a clearing commission of the at least one payment method, and benefit information that includes a discount rate and a point accumulation rate of the at least one payment method. The controller is further configured to output information for guiding the user to change settings of at least one of the plurality of payment methods based on there not being any available payment methods in the plurality of payment methods.

The controller is further configured to receive the network identification information through (i) a track area identifier (TAI) list that is included in an attach accept message received from a mobile management entity of an accessed communication network upon the mobile terminal initially accessing the accessed communication network or (ii) a tracking area update (TAU) accept message received from the mobile management entity upon a movement of the mobile terminal. Identifying the country where the mobile terminal is located is further based on a mobile country code (MCC) or a mobile network code (MNC) included in the network identification information. The controller is further configured to request, from the visited network, information of a payment method available in the visited network based on accessing the visited network, and acquire information related to a specific payment method through a communication network associated with the specific payment method based on information of the specific payment method being received in response to the request. The network identification information is a Public Land Mobile Network ID.

According to another innovative aspect of the subject matter described in this application, a method for controlling a mobile terminal includes the actions of identifying a communication network of the mobile terminal by receiving network identification information from an accessed communication network; identifying, from the received network identification information, a country according to a location of the mobile terminal based on the identified communication network being a visited network; and outputting, as an available payment method, at least one payment method of a plurality of payment methods that are prestored in the mobile terminal, the at least one payment method having a same brand as a card association brand that is accepted in the identified country.

An aspect of the detailed description is to provide a mobile terminal, capable of recommending at least one of a plurality of payment means to a user according to a user's current environment or situation, to facilitate the user to select one payment means appropriate for the current environment, in a mobile terminal having the plurality of payment means, and a method for controlling the same.

BRIEF DESCRIPTION OF THE DRAWINGS

FIG. 9 is an exemplary view illustrating an example in which payment means changes into another payment means available in a country that a mobile terminal is currently located during roaming.

FIG. 13 is an exemplary view illustrating an example of presetting payment means available at a specific overseas region in a mobile terminal.

FIGS. 14A and 14B are exemplary views illustrating examples in which a user-authentication method is differently set according to a requested payment.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1:
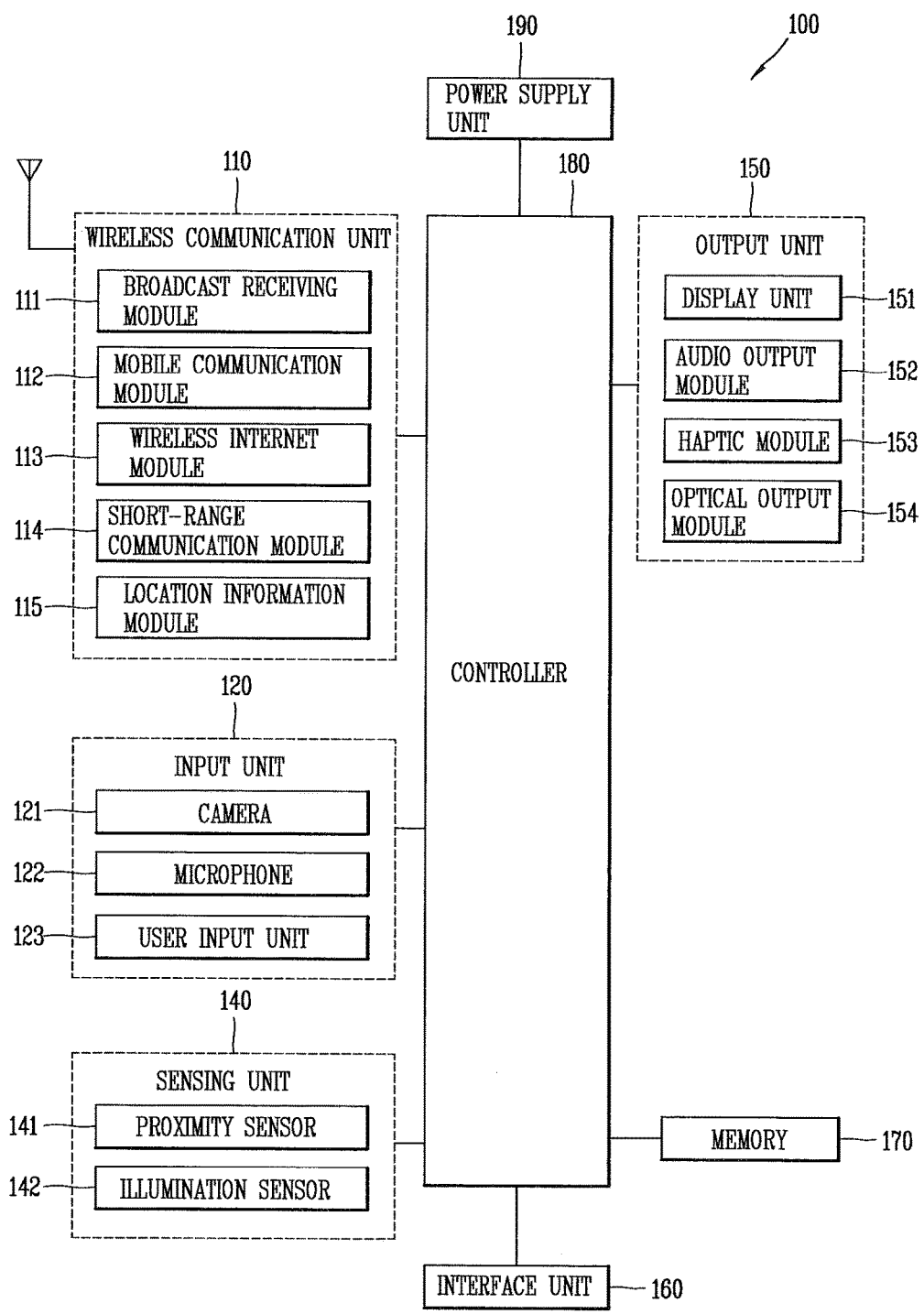
FIG. 1 is a block diagram of a mobile terminal in accordance with the present disclosure.

First, FIG. 1 is a block diagram illustrating a mobile terminal 100.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of components of the mobile terminal according to the one embodiment illustrated in FIG. 1, or a structure of the mobile terminal, with reference to FIGS. 1B and 1C.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side due to the touch screen or rear input unit replacing at least some functions of the first manipulation unit 123a provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal 100 according to an exemplary embodiment disclosed herein may include a plurality of payment means (payment methods, payment media, etc.). Here, the payment means included in the mobile terminal 100 refers to a means used by a purchaser to pay for an item to a seller, and may include a credit card, a debit card and the like stored in the mobile terminal 100. Upon detection of a payment request and a user's approval for the payment request, the controller 180 may transmit information related to one payment means selected from the plurality of payment means, in response to the payment request, thereby facilitating the payment in response to the payment request.

Hereinafter, description will be given of relevant embodiments of a control method which can be implemented in the mobile terminal 100 having such configuration, with reference to the accompanying drawings. It may be obvious those skilled person in the art that the present disclosure can be embodied in different specific forms, without departing from the spirit and essential features of the present disclosure.

Figure 2:
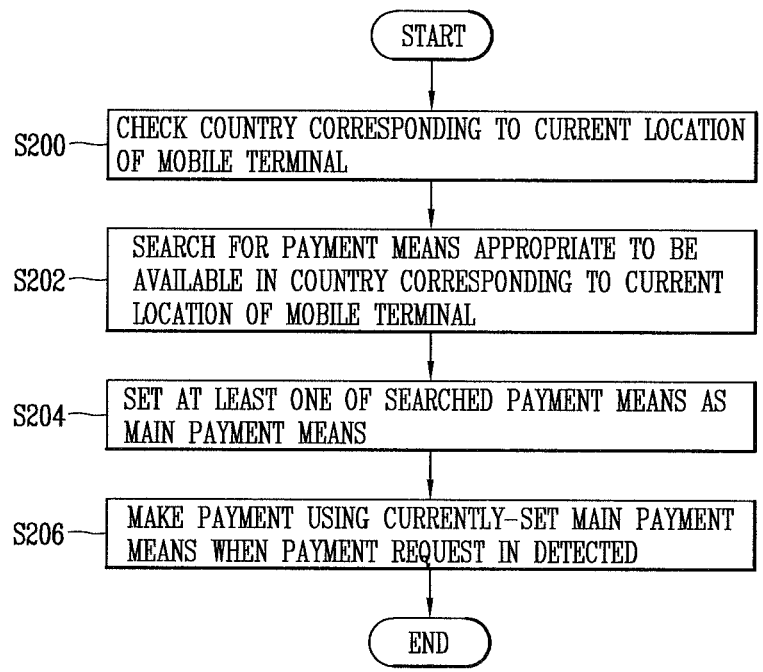
FIG. 2 is a flowchart illustrating operations of changing main payment means according to a currently-located country in a mobile terminal.

FIG. 2 is a flowchart illustrating operations of changing a main payment means according to a currently-located country, in a mobile terminal.

The controller 180 of the mobile terminal 100 disclosed herein may check a country in which a user is currently visiting according to a current location (position) of the mobile terminal 100 (S200). In step S200, the controller 180 may check the country corresponding to the current location of the mobile terminal 100 in various manners.

For example, when the mobile terminal 100 accesses a visited network during roaming, the controller 180 may identify a country corresponding to a current location of the mobile terminal 100 based on information received from the visited network.

In general, roaming refers to a service that a mobile telecommunication company (mobile phone carrier or mobile carrier) allows its subscribers to place or receive calls through facilities of different mobile carriers at a region without its own communication facilities. The roaming may allow the mobile terminal 100 to share and use networks of different mobile phone carriers so as to cover a wider region with less costs. Here, a communication network of a mobile phone carrier in which a subscriber is registered is referred to as a home network, and a communication network of a different mobile phone carrier which is accessed during roaming is a visited network.

The roaming may allow a user to perform mobile communication abroad by using a phone number, which the user uses at home. In this instance, the roaming performed abroad may be allowed in a manner that the mobile terminal 100 accesses a communication network (visited network) of an overseas mobile phone carrier cooperated with a domestic mobile phone carrier in which a subscriber of the mobile terminal 100 is registered.

Meanwhile, the controller 180 of the mobile terminal 100 may identify access or non-access to the visited network from a public land mobile network (PLMN) ID received through a currently-accessed communication network. That is, the controller 180 may compare a PLMN ID of a home network that it has with a PLMN ID of a currently-accessed communication network. If the two PLMN IDs are not equal to each other, the controller 180 of the mobile terminal 100 may determine to have currently accessed a visited network. The controller 180 may also identify a current location of the mobile terminal 100 from the PLMN ID.

Hereinafter, description will be given in more detail of a process or operation of identifying a current location of the mobile terminal 100 based on information received by the mobile terminal 100 from a visited network, in accordance with an exemplary embodiment disclosed herein, with reference to FIGS. 3 to 6.

In the meantime, in step S200, the controller 180 may acquire a location of the mobile terminal 100 using the location-information module 115 such as a GPS module or WiFi module. The controller 180 may thus check information related to a country corresponding to the acquired location.

Or, the controller 180 may use various information received in the mobile terminal 100 for identifying a region where the mobile terminal 100 is currently located. For example, the controller 180 may identify a country corresponding to a current location of the mobile terminal 100 through a roaming notification message or the like, which is received to notify the ongoing roaming service.

Or, the controller 180 may identify a current location of the mobile terminal 100 through peripherals which can provide information related to the current location of the mobile terminal 100. Here, the peripherals may be various. For example, the peripherals may be a payment terminal transmitting a payment request to the mobile terminal 100, and the like.

Meanwhile, in step S200, upon checking the country corresponding to the current location of the mobile terminal 100, the controller 180 may recommend for the user at least one payment means, which is appropriate to be used in the country corresponding to the current location of the mobile terminal 100, among the plurality of payment means included in the mobile terminal 100 (S202).

To this end, in step S202, the controller 180 may collect information related to the country, in which the mobile terminal 100 is currently located, with respect to each of the plurality of payment means included in the mobile terminal 100. For example, the controller 180 may collect information related to the currently-located country of the mobile terminal 100 from issuers, namely, banks or credit card companies, which have issued the payment means, respectively. The collected information on each payment means may include information indicating whether or not the payment means is available in the country corresponding to the current location of the mobile terminal 100, a card association brand provided in each payment means, a country-based discount or commission benefit, or tax exemption with respect to a specific region of a corresponding country.

Meanwhile, when those pieces of information related to the payment means are collected, the controller 180 may search for at least one of the plurality of payment means based on various preset criteria, and output the search results.

For example, the controller 180 may search for a payment means which is available in the country that the mobile terminal 100 is currently located, among the plurality of payment means included in the mobile terminal 100. Here, whether or not a payment means is available in the country that the mobile terminal 100 is located may be decided based on an overseas use restriction set in the payment means, whether or not a currency supported by the corresponding payment means is available in the country that the mobile terminal 100 is located, an expiration date of the payment means, or the like.

That is, the controller 180 may determine that the corresponding payment means of the plurality of payment means is unavailable when the use of the payment means is set to be restricted abroad, namely, when an overseas use restriction has been set. Or, the controller 180 may determine that the corresponding payment means is unavailable when the payment means does not support a payment with a currency accepted in the country that the mobile terminal 100 is located. The controller 180 may also determine that the corresponding payment means is unavailable when the payment means is to be expired within a predetermined period. In this instance, the controller 180 may check how long the user is to stay abroad, on the basis of user's schedule information or airline ticket purchase history information stored in the mobile terminal 100. The controller 180 may also determine a payment means, which is to be expired within the checked period of stay abroad, to be unavailable.

And, according to the search result, the controller 180 may discriminatively output payment means available in the country that the mobile terminal is currently located and unavailable payment means, of the plurality of payment means. In this instance, when one payment means is available in the currently-located country, the controller 180 may immediately set the currently-searched payment means as 'main (or major) payment means.'

Here, 'main payment means' may refer to a payment means previously selected by a user from a plurality of payment means, such that a payment can be made via the previously-selected payment means in response to a sensed payment request. In this instance, the payment means selected as the 'main payment means' may be a payment means in an 'active (or activated) state),' and payment means which are not selected as the 'main payment means' may be payment means in an 'inactive (or deactivated) state.'

On the other hand, whether there is no payment means which is available in the country that the mobile terminal 100 is located among the plurality of payment means, the controller 180 may notify (or guide) the user to get a new payment means available in the corresponding country. Or, the controller 180 may output guide information for the user to request for changing settings of at least one of the plurality of payment means to be available in the country that the mobile terminal 100 is currently located.

On the other hand, when plural payment means which are available in the country that the mobile terminal 100 is currently located have been searched for among the plurality of payment means, the controller 180 may select at least one of the searched plural payment means as a main payment means in various manners.

For example, the controller 180 may search for a payment means having the same brand as a card brand of the card association, which is acceptable in the country checked in step S200, from the plurality of payment means. Here, 'Card Association' may refer to networks of a card issuer and a purchaser processing payment cards having a specific brand, namely, 'MASTER,' 'VISA,' and the like. That is, when the brand of the card association acceptable in the country that the mobile terminal 100 is currently located is 'MASTER,' the controller 180 may search for payment means having the brand 'MASTER' from the plurality of payment means prestored, and output the searched payment means in a distinguishable manner. In this instance, if one payment means has been searched for, the controller 180 may immediately set the currently-searched payment means as the 'main payment means.'

On the other hand, when plural payment means with the same brand as the card brand of the card association, acceptable in the country checked in step S200, have been searched for, the controller 180 may further output information related to benefits of each payment means according to the country corresponding to the current location of the mobile terminal 100. The benefit-related information may include region-based discount, clearing commission, tax exemption or the like for a specific region, in relation to the currently-located country. In this manner, in step S202, the payment means available in the country that the mobile terminal 100 is currently located may be searched for, and information related to each searched payment means involved in the currently-located country may be output on the display unit 151. This operation will be described later in more detail, with reference to FIG. 7.

The controller 180 may output information related to a plurality of payment means currently included in the mobile terminal 100 in step S202. The controller 180 may allow the user to select at least one of the plurality of payment means. The controller 180 may then set the selected at least one payment means as 'main payment means' (S204). In this instance, the step S204 may be a step of setting at least one payment means, which has been selected by the user from a plurality of payment means stored in the mobile terminal 100, into an active state, and the other payment means except for the selected payment means into an inactive state. In this instance, the controller 180 may control a payment to be made only via the payment means in the active state.

Meanwhile, when the main payment means is set, the controller 180 may detect whether or not a payment request is received. When the payment request is received, the controller 180 may transmit information related to the payment means currently set as the 'main payment means,' in response to a user's approval for the payment request, and then control the payment to be made in response to the payment request (S206).

The main payment means may also be in plurality. For example, the controller 180 may set a plurality of main payment means, such that different payment means can be used according to a user selection on the basis of surroundings detected when a payment request is received. As one example, the controller 180 may control payment to be made by different payment means, according to a total amount of spent money, according to a payment-requested amount, or whether or not the mobile terminal 100 is located at a specific location or a specific region (e.g., a duty-free shop).

Accordingly, when overseas roaming of the mobile terminal 100 is detected (sensed), the controller 180 of the mobile terminal 100 according to the embodiment disclosed herein may output information related to availability or benefits of each of the plurality of prestored payment means in the country corresponding to the current location of the mobile terminal 100, namely, the country that the user is staying. The controller 180 may then allow the user to select one payment means based on the availability, the benefits, and the like, thereby more facilitating the search for a payment means appropriate to be used in the currently-located country.

Meanwhile, it has been described that the controller 180 of the mobile terminal 100 according to the exemplary embodiment disclosed herein can identify a country corresponding to a currently-located region of the mobile terminal 100 from information related to an accessed visited network when overseas roaming is detected. Hereinafter, description will be given in more detail of an operation of the mobile terminal 100 in this instance, with reference to FIGS. 3 to 6.

Figure 3:
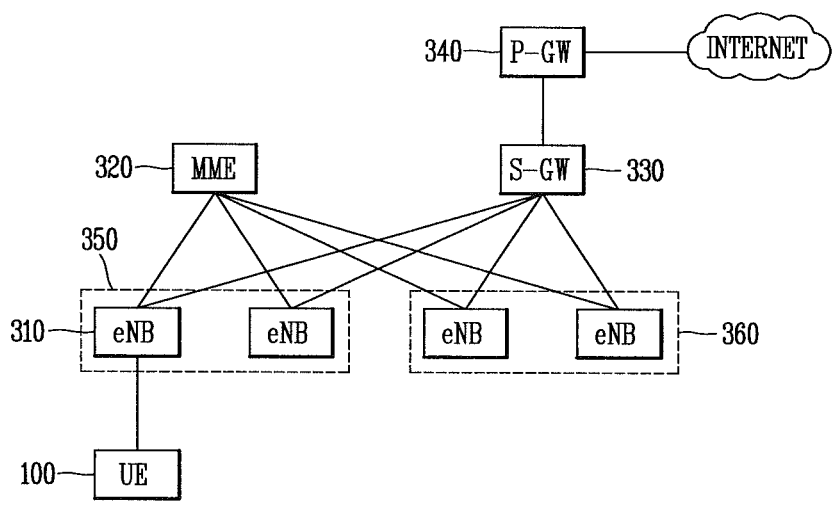
FIG. 3 is a conceptual view illustrating an example of a network environment that a mobile terminal accesses.

First of all, FIG. 3 is a conceptual view illustrating an example of a network environment that a mobile terminal accesses.

Referring to FIG. 3, eNB 310 may be wirelessly connected to a user equipment (UE; mobile terminal) 100. The eNB 310 may assign a frequency to the UE 100, and manage every wireless function including a wireless bearer control, an approval control, a mobility control, scheduling and security. The eNB 310, for example, may be installed at each of a plurality of cells constructing a tracking area (TA).

The eNB 310 may be connected to a core network, which includes a mobility management entity (MME) 200, a serving gateway (S-GW) 330, and a packet gateway (P-GW) 340.

The MME 320 may be connected to the eNB 310 via a wireless channel, manage the UE 100 in an idle mode, and designate (select) the S-GW 330 and the P-GW 340. The MME 320 may carry out functions involved in roaming and authentication, and process bearer signals generated in the UE 100.

The S-GW 330 may serve as a mobility anchor during movement of the UE 100.

The P-GW 340 may assign an Internet protocol (IP) address to the UE 100, carry out functions involved in packet data of the core network, and serve as a mobility anchor while the UE 100 moves between a 3GPP wireless network and a non-3GPP wireless network.

Figure 4:
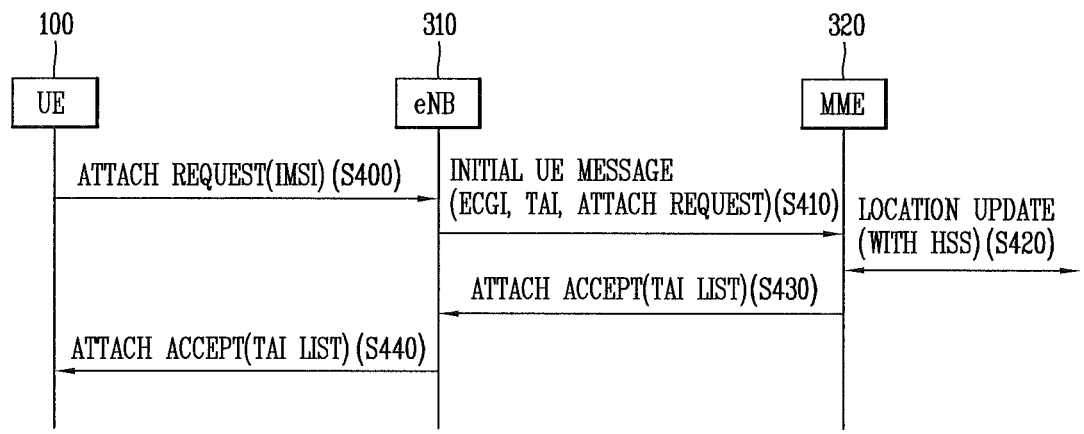
FIG. 4 is a flowchart illustrating an operation in which the mobile terminal initially accesses the network of FIG. 3.

Meanwhile, FIG. 4 is a flowchart illustrating a process in which the mobile terminal 100 is registered to use an accessed wireless network when the mobile terminal 100 initially accesses such the wireless network environment.

When the mobile terminal, namely, the UE 100 is powered on, the UE 100 may transmit an ATTACH REQUEST message to a base station (eNB) 310 of a cell, at which the UE 100 is located, in order to request for using a network from the MME 310 (3400). Here, the ATTACH REQUEST message may include international mobile subscriber identity (IMSI) which is identification information of the UE 100.

Upon reception of the ATTACH REQUEST message, the eNB 310 may transmit to the MME 320 an initial UE message, which includes an ID (Evolved-universal terrestrial radio access network (E-UTRAN) cell global identifier; ECGI) of a cell where the eNB 310 is located, and track area identifier (TAI) information related to the cell. Here, the eNB 310 may transmit the ATTACH REQUEST message by attaching it in the initial UE message. The TAI may refer to identification information related to a track area (TA) including the cell of the eNB 310 which has received the ATTACH REQUEST message.

In the meantime, the MME 310 may update a location of the UE 100 based on those information, namely, IMSI, TAI and the like, included in the received initial UE message (S420). During step S420, the MME 320 may authenticate the UE 100 through a home subscriber server (HSS), and register the UE 100 such that the UE 100 can access a network when the UE 100 is an authenticated subscriber.

The MME 320 may transmit an ATTACH ACCEPT message to the UE 100, in response to the ATTACH REQUEST message of the UE 100. To this end, the MME 320 may transmit the ATTACH ACCEPT message to the eNB 310 such that the ATTACH ACCEPT message can be transferred to the UE 100 (S430). The eNB 310 may then transfer the ATTACH ACCEPT message received from the MME 320 to the UE 100 (S440). The UE 100 may thus recognize that it has been registered in the currently-accessed network and can perform wireless communication through the accessed network.

Meanwhile, during step S430, the MME 310 may transmit identification information (TAI list) related to other TAs adjacent to a TA corresponding to the TAI information received from the eNB 310, based on the TAI information included in the initial UE message, in a manner of attaching the identification information to the ATTACH ACCEPT message. Accordingly, the UE 100 which has received the ATTACH ACCEPT message may acquire the information related to the currently-located TA and other TAs adjacent to the currently-located TA.

The TAI list, as aforementioned, may include information related to other TAs adjacent to the TA at which the UE (mobile terminal) 100 is located, namely, the TAI information. The TAI information may include information related to a location of a corresponding TA.

Figure 5:
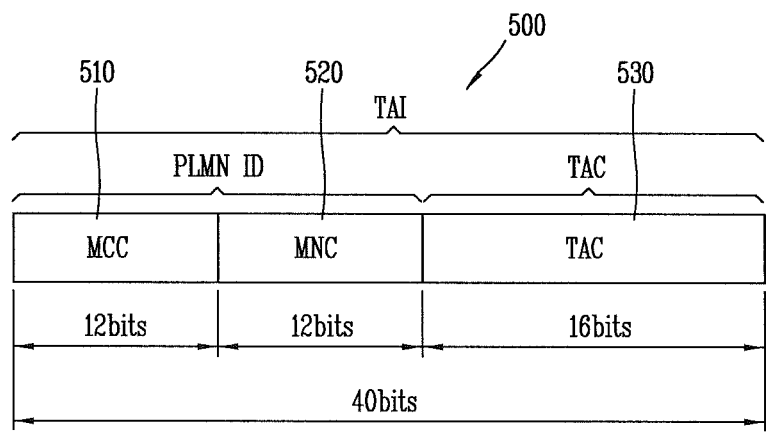
FIG. 5 is a conceptual view illustrating a frame structure of track area identifier (TAI) information received in a mobile terminal.

FIG. 5 is a conceptual view illustrating a frame structure of the TAI information.

Referring to FIG. 5, the TAI information may be in the form of data of 40 bits in maximum, and may include a PLMN ID 550, and a track area code (TAC) 530. Here, the TAC 530 may refer to an inherent value assigned for each TA by a mobile phone carrier, and the PLMM ID 550 may refer to an inherent value for identifying a mobile phone carrier.

The controller 180 may compare the PLMN ID 550 with a home PLMN ID currently stored in the memory 170. When the PLMN ID 550 acquired from the received TAI information is different from the home PLMN ID, the controller 180 may determine that the mobile terminal 100 has currently accessed another network, other than a home network, namely, accessed a visited network.

Here, the PLMN ID 550, as illustrated in FIG. 5, may include a mobile country code (MCC) 510, and a mobile network code (MNC) 520. The controller 180 may identify identification information related to the currently-accessed visited network, and a currently-located region, namely, a currently-located country of the mobile terminal 100, from the MCC 510 and the MNC 520 included in the acquired PLMN ID 550, namely, the PLMN ID 550 of the visited network. For example, 'South Korea' may have the MCC 510 assigned with '450,' 'SKT' which is one of mobile phone carriers in 'South Korea' may have the MNC 520 assigned with '05.' Therefore, when the PLMN ID 550 is '45005,' it can be recognized that the mobile terminal 100 has currently accessed a network of the mobile phone carrier 'SKT' located in 'South Korea.'

Accordingly, the mobile terminal, namely, the UE 100 according to the embodiment disclosed herein may identify the country corresponding to the current location based on the received TAI list. That is, the controller 180, as aforementioned, may check the MCC 510 from the TAI information included in the TAI list received from the MME 320. The controller 180 may thus identify the country that the mobile terminal 100 is currently located from the checked MCC 510.

To this end, the mobile terminal 100 according to the embodiment disclosed herein may prestore information for identifying a specific country from the checked MCC 510 in the memory 170. In this instance, the information stored in the memory 170 may include country information corresponding to each MCC. Hereinafter, information for identifying a country corresponding to a specific MCC is referred to as MCC country identification information.

Similar to this, the controller 180 of the mobile terminal 100 according to the embodiment disclosed herein may also check the MNC 520 from each TAI information included in the TAI list. In this instance, the controller 180 may also check information related to a currently-accessed network, namely, mobile phone carrier information involved in a region (TA) at which the mobile terminal 100 is currently located, from the checked MNC 520. Similar to the MCC country identification information, MNC network identification information for identifying a network from the checked MNC 520 may further be stored in the memory 170.

Meanwhile, the mobile terminal, namely, the UE 100 according to the embodiment disclosed herein may move to a different location at any time as the user moves. When the UE 100 moves out of a tracking area (TA) in response to the user's movement, the UE 100 may sense this and perform a tracking area update (TAU).

For example, the UE 100 may receive broadcast system information block 1 (SIB1) broadcasted from a base station (eNB) 310 of a currently-located cell. Here, the base station (eNB) 310 of the cell may broadcast inherent information, namely, track area code (TAC) related to a TA, to which the eNB 310 belongs, through the SIB1.

The UE 100 may check whether or not a TAI corresponding to the TAC received from the eNB 310 is present in those TAI information included in the prestored TAI list. When the TAI corresponding to the TAC received from the eNB 310 is not present in the prestored TAI list, the UE 100 may recognize the change in the TA, and starts to perform the TA update (TAU) procedure.

Or, the UE 100 may perform the TAU procedure after a lapse of a preset period of time for a periodic TAU.

Figure 6:
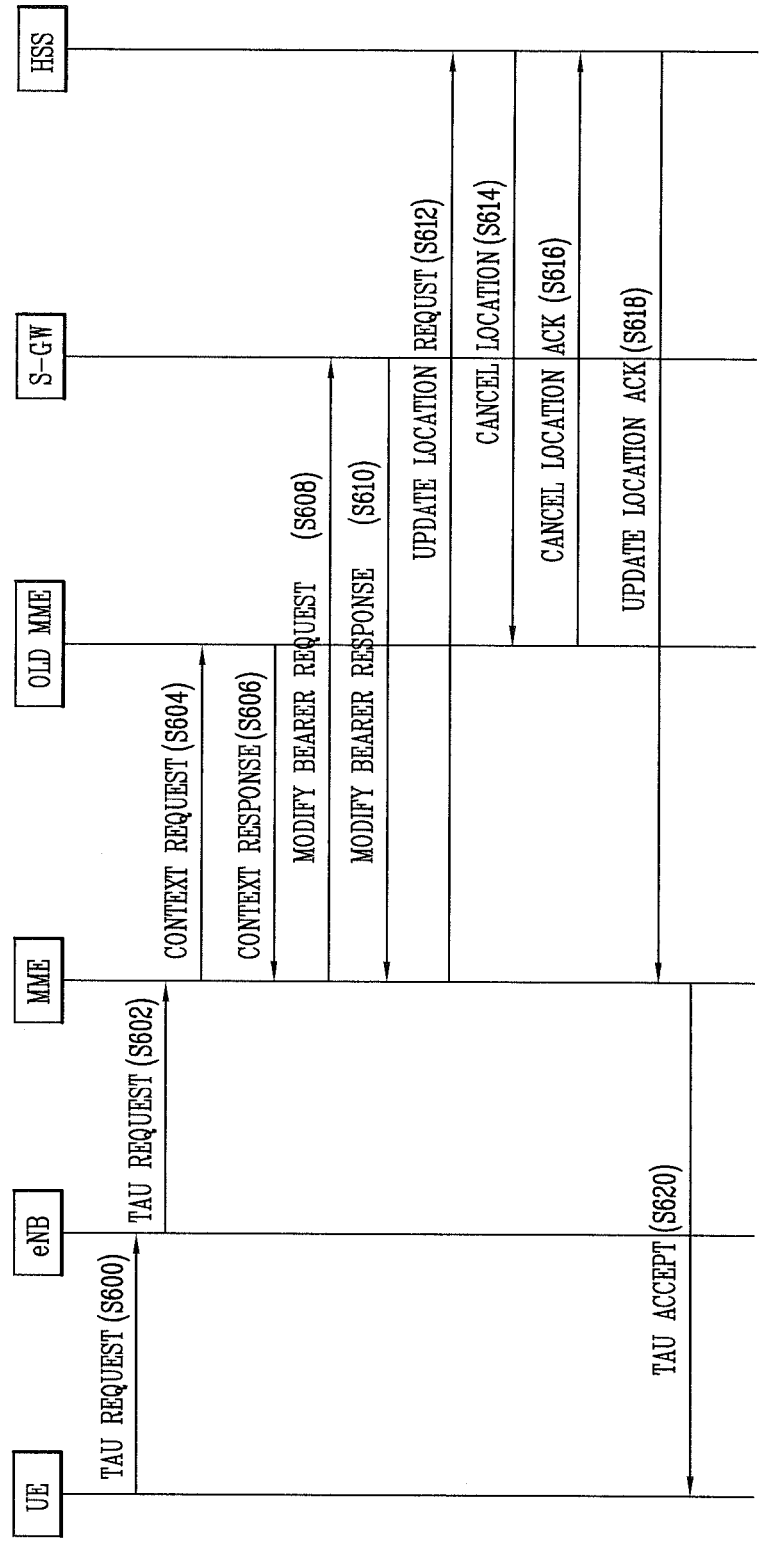
FIG. 6 is a flowchart illustrating an operation in which a mobile terminal executes a track area update (TAU) procedure when a change in a track area (TA) is detected.

FIG. 6 is a flowchart illustrating a procedure in which the UE 100 performs the TAU when the TAI corresponding to the TAC received from the eBN 310 is not present in the TAI information included in the prestored TAI list.

Referring to FIG. 6, the UE 100 may transmit a TAU Request message to the eNB 310 (S600), and the eBN 310 may transfer the TAU Request message to the MME 320 (S602). The MME 320 may transmit a Context Request message for requesting context information related to the UE 100 to an MME, namely, an old MME to which the UE 100 has previously been connected (S604), and receive a context response message to the request (S606).

Afterwards, the MME 320 may transmit a MODIFY BEARER REQUEST message for requesting for a bearer modification from the S-GW 330 (S608), and receive a response to the MODIFY BEARER REQUEST message (S610).

The MME 320 may transmit an UPDATE LOCATION REQUEST message for requesting for a location update from a home subscriber server (HSS) (S612). The HSS may then cancel a location registration of the old MME (S614, S616) and transmit a response (UPDATE LOCATION ACK) to the location update to the MME 320 (3618).

The MME 320 may transmit a TAU ACCEPT message for accepting the TAU to the UE 100 (S620).

In this instance, the MME 320 may transmit the TAI list along with the TAU REQUEST message. Here, the TAI list may refer to a list including TAIs of other TAs adjacent to the TA at which the UE 100 is currently located.

Therefore, the UE 100, namely, the mobile terminal 100 according to the embodiment disclosed herein may acquire the TAI information involved in the currently-located TA, and the TAI information involved in the adjacent TAs upon the completion of the TAU procedure. The controller 180 of the mobile terminal 100 may acquire the PLMN ID including the MCC and MNC in a manner of parsing the TAI information. The acquired PLMN ID may allow for identifying identification information related to the currently-accessed visited network, and the region, namely, the country where the mobile terminal 100 is currently located.

Accordingly, the controller 180 of the mobile terminal 100 according to the embodiment disclosed herein, as illustrated in FIGS. 3 to 6, may acquire the information related to the currently-located country of the mobile terminal 100, and the mobile phone carrier of the currently-located region, upon an initial registration in a network or upon a change in a location due to a user's movement.

Meanwhile, in step S200 of FIG. 2, when the country corresponding to the currently-located region of the mobile terminal 100, namely, the currently-located country of the mobile terminal 100 is identified, the controller 180 may search for at least one of the plurality of payment means prestored in the mobile terminal 100 as a payment means appropriate to be used in the identified country, on the basis of the country identified in step S202 of FIG. 2.

Meanwhile, in a specific case, the ATTACH ACCEPT message or TAU ACCEPT message illustrated in FIGS. 4 to 6 may not be received. For example, the ATTACH ACCEPT message or TAU ACCEPT message may not be received, when the mobile terminal 100 accesses another network, except for an LTE or 3GPP network, in response to a user's movement, when the access of the UE 100 to the network is rejected during a network access procedure (or when an ATTACH REJECT message is received), or when a TA update request is rejected (or when a TAU REJECT message is received). In this instance, in response to non-reception of the ATTACH ACCEPT message or TAC ACCEPT message, the controller 180 may fail to receive the identification information (e.g., PLMN ID) involved in the visited network according to a current location of the mobile terminal 100.

The controller 180 of the mobile terminal 100 according to this embodiment disclosed herein may thus detect (sense) this state. For example, when the ATTACH ACCEPT message or TAU ACCEPT message is not received for a preset period of time or more after the transmission of the ATTACH REQUEST message or TAU REQUEST message, the controller 180 may determine this state as a state of a reception failure of the ATTACH ACCEPT message or TAU ACCEPT message. Or, when the ATTACH ACCEPT message or TAU ACCEPT message is not received even though performing the attach request or TAU request process of FIGS. 4 and 6 more than a preset number of times, the controller 180 may determine this as an unreceivable state. Or, when the ATTACH REJECT message or TAU REJECT message is received, the controller 180 may determine this as an unreceivable state of the ATTACH ACCEPT message or TAU ACCEPT message.

Accordingly, the controller 180 may acquire information related to a country or a visited network according to a current location of the mobile terminal 100 in different manners. For example, the controller 180 may calculate a current location of the mobile terminal 100 using a GPS or WiFi module included in the location-information module 115, and acquire country information based on the calculated current location. Or, the controller 180 may acquire information related to a country and a visited network corresponding to a current location of the mobile terminal 100 through a peripheral (e.g., a payment terminal) which is connectable to the mobile terminal 100. Or, the controller 180 may identify a country corresponding to a current location of the mobile terminal 100 based on text recognized from a message (e.g., a message notifying a user's movement to another location, etc.) received from a specific originator. The controller 180 may then search for at least one of payment means prestored in the mobile terminal as a payment means which is appropriate to be used in the country where the mobile terminal 100 is currently located, on the basis of the identified country or visited network.

Figure 7:
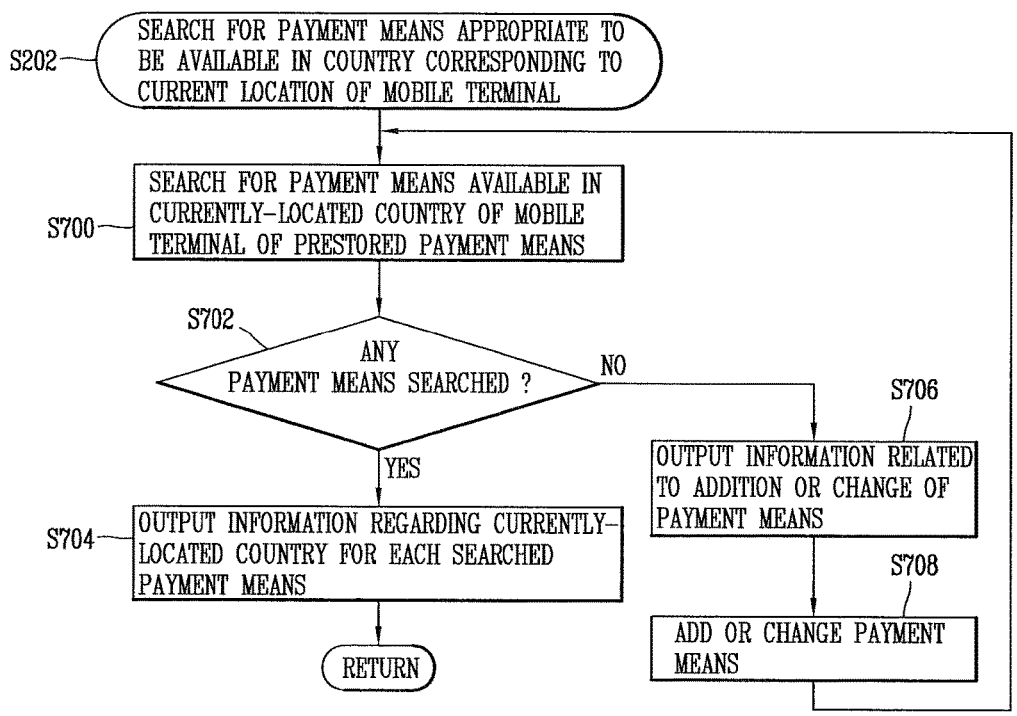
FIG. 7 is a flowchart illustrating in more detail a process of searching for appropriate payment means according to a current location of a mobile terminal, of the operations illustrated in FIG. 2.

FIG. 7 illustrates in more detail a process of searching for an appropriate payment means according to the current location of the mobile terminal 100 in step S202 of FIG. 2.

Referring to FIG. 7, the controller 180 of the mobile terminal 100 according to the embodiment disclosed herein may search for a payment means, which is available in the currently-located country of the mobile terminal 100, from the plurality of payment means currently stored in the mobile terminal 100 (S700).

For example, in step S700, the controller 180 may detect payment means with allowable countries for use, on the basis of information collected for each of the plurality of payment means. That is, in step S700, the controller 180 may detect payment means, whose use is restricted abroad or in a country where the mobile terminal 100 is currently located. The controller 180 may thus identify another payment means, except for the detected payment means, among the prestored payment means, as an available payment means in the country where the mobile terminal 100 is currently located.

Meanwhile, in step S700, the controller 180 may check whether or not the payment means prestored in the mobile terminal include the payment means which has been identified as the available payment means in the country where the mobile terminal 100 is currently located (S702). According to the check result in step S702, when there are the available payment means in the country where the mobile terminal 100 is currently located, the controller 180 may output various types of information related to the currently-located country, with respect to each of the payment means identified as the currently-available payment means.

The various types of information output may include information related to a country-based discount or clearing commission, or tax exemption for a specific region of the corresponding country. Or, when a specific event (e.g., a festival, a sports game, etc.) is held in the currently-located country, related information may further be output. In this instance, when the corresponding payment means provides a specific benefit involved in the specific event, the controller 180 may further output information related to the benefit (e.g., 2004 Worldcup in South Korea, an additional discount given for a payment of a specific soccer game ticket, etc.)

The benefit-related information may be output to correspond to each payment means. For example, the controller 180 may control the benefit information provided by the payment means, respectively, to be output on images of the payment means, identified as the available payment means in step S702. Accordingly, the mobile terminal may allow the user to compare benefit information for each payment means, and select at least one payment means as 'main payment means' according to the comparison result of the benefit information. Description will be given in more detail later of examples of outputting benefit-related information provided by each payment means for a country where the mobile terminal 100 is currently located and selecting a specific payment means accordingly, with reference to FIGS. 12A to 12D.

When there is no payment means which is available in the country where the mobile terminal 100 is currently located according to the check result in step S702, the controller 180 may output information related to an addition or change of a payment means on the display unit 151 (S706).

In step S706, the controller 180 may output on the display unit 151 information related to at least one payment means available in the country where the mobile terminal 100 is currently located. Or, the controller 180 may output a menu for the user to request for changing settings of at least one of the plurality of payment means such that the at least one payment means is available in the country where the mobile terminal 100 is currently located.

The controller 180 may add a new payment means or change a state of at least one of the plurality of payment means according to a changed state (S708). That is, the controller 180 may output on the display unit 151 information related to an added new payment means when the new payment means is added by the user. Or, at least one payment means may be changed to be available in the country where the mobile terminal 100 is currently located according to the change request. Hereinafter, examples of outputting information related to an addition or change of a payment means when there is no payment means available in the country where the mobile terminal 100 is currently located will be described in more detail later with reference to FIGS. 11A and 11B.

Meanwhile, when the new payment means is added or the state of the payment means is changed, the controller 180 may go back to steps S700 and S702 to check whether or not there is a payment means available in the country where the mobile terminal 100 is currently located. In this instance, the payment means which has newly been added or of which restriction-related setting has changed may be identified as one available in the country where the mobile terminal 100 is currently located in steps S700 and S702. And, in step S704, benefits provided by the payment means, which has newly been added or of which restriction-related setting has changed, with respect to the country where the mobile terminal 100 is currently located may be output on the display unit 151.

The foregoing description has been given, with reference to those flowcharts, of operations in which when overseas roaming occurs, the mobile terminal 100 disclosed herein searches for payment means available in a currently-located country and outputs information regarding benefits provided by each of the searched payment means for the currently-located country, such that a user can more easily select a payment means appropriate to be used in the country where the user is currently staying.

Hereinafter, description will be given of examples of automatically changing 'main payment means' based on a currently-located country of the mobile terminal 100 disclosed herein due to overseas roaming, and examples of outputting benefit information involved in each of payment means available in the currently-located country of the mobile terminal 100, with reference to the accompanying exemplary views. The following description will be given under assumption that payment means stored in the mobile terminal 100 are business cards (or credit cards) or debit cards, for the sake of explanation. However, the payment means disclosed herein may not be limited to this, and may also be any virtual money, such as cyber money, bit coin and the like. It will also be obvious to those skilled in the art that an image corresponding to the virtual money such as the cyber money or the bit coin is output similar to an image of the credit card or debit card and the virtual money can be selected by a user as a payment means.

Figure 8:
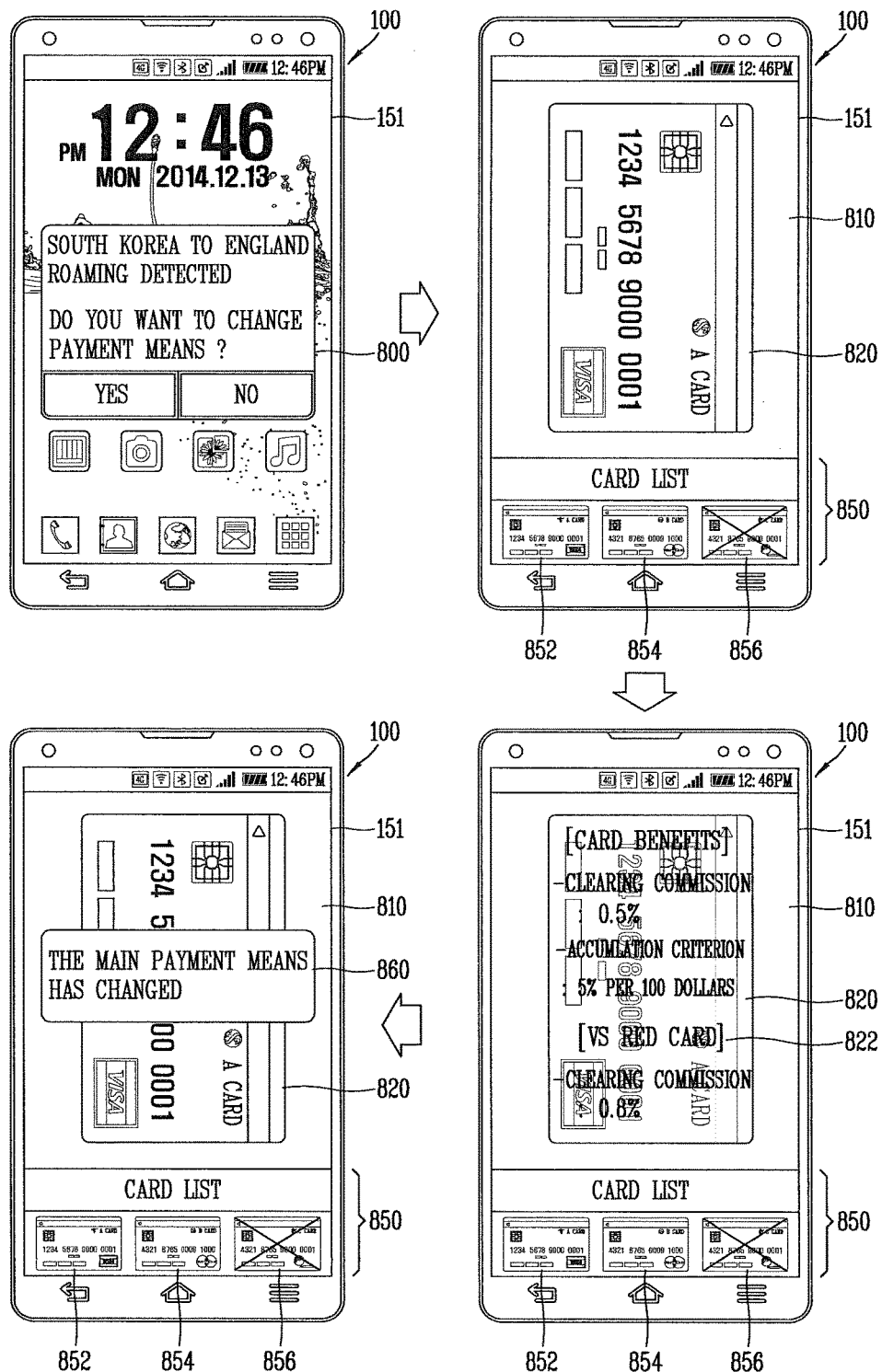
FIG. 8 is an exemplary view illustrating an example in which payment means changes according to a country that a mobile terminal is currently located during roaming.

First, FIG. 8 is an exemplary view illustrating an example in which a payment means is changed according to a country where the mobile terminal 100 is currently located when the mobile terminal 100 is roamed.

A first drawing of FIG. 8 illustrates an example in which the mobile terminal 100 detects overseas roaming according to a user's movement, and outputs information related to an identified country.

The mobile terminal 100 disclosed herein may detect the occurrence of the overseas roaming in various manners. For example, as illustrated in FIGS. 3 to 6, when the mobile terminal 100 accesses a visited network due to the overseas roaming, the mobile terminal 100 disclosed herein can identify a currently-located country based on a PLMN ID information received from the visited network. The mobile terminal 100 may then detect whether or not roaming has occurred according to the identified country.

Or, the controller 180 of the mobile terminal 100 disclosed herein may detect an occurrence of overseas roaming from a guide message sent from a mobile phone carrier in which a specific originator, for example, the user has subscribed. For example, upon receiving a roaming guide message provided for guiding a roaming fee and the like, the controller 180 may identify a currently-located country of the mobile terminal 100 based on the roaming guide message. That is, when the roaming guide message is a fee guide message, such as "1700 Won per minute while making a call from England to Korea, 1072 Won per minute while receiving a call from England to Korea, and 7 Won per kilobyte for data," the controller 180 may detect or calculate a country name, such as 'England' from the message and identify that the mobile terminal 100 is currently located in a country corresponding to the calculated country name.

Or, the controller 180 may measure a current location using a location-information module, such as a GPS module or a WiFi module, and identify a currently-located country of the mobile terminal 100 based on the measured location. Or, the controller 180 may acquire location information from a peripheral, for example, a payment terminal (e.g., POS terminal) which can provide such location information, and identify a currently-located country of the mobile terminal from the acquired location information.

When the identified country is different from a country which has previously been identified as a location of the mobile terminal 100, the controller 180 may determine this as the occurrence of the overseas roaming. In this instance, the controller 180, as illustrated in a first drawing of FIG. 8, may control the display unit 151 to output notification information 800 for notifying the detected overseas roaming to the user. In this instance, the notification information 800 may include information regarding a country to which the mobile terminal 100 has been moved, namely, a country corresponding to a currently-located place of the mobile terminal 100.

Meanwhile, the notification information 800 may also include a menu for the user to select a change of a payment means. In this instance, when the user selects the change of the payment means through the menu included in the notification information 800, the controller 180 may output information related to the change of the payment means.

Two through fourth drawings of FIG. 8 illustrate examples of outputting information related to the change of the payment means.

As illustrated in the first drawing of FIG. 8, when the change of the payment means is selected by the user through the notification information 800, the controller 180 may output information related to payment means currently stored in the mobile terminal 100 on the display unit 151. In this instance, the controller 180 may output the information related to the payment means by dividing the display unit 151 into a plurality of areas. For example, as illustrated in the second drawing of FIG. 8, the controller 180 may divide the display unit 151 into a second area 850 for outputting thumbnail images for the plurality of payment means stored in the mobile terminal 100, respectively, and a first area 810 for outputting detailed information related to one of the plurality of payment means.

In this instance, an image 820 including more detailed information related to a specific payment means may be output on the first area 810. Here, when the payment means is a specific credit card, the payment means image 820, as illustrated in the second drawing of FIG. 8, may be output in a manner that information related to a name, a card number, and a card association brand of the credit card can be identified.

Meanwhile, thumbnail images 852, 854 and 856 for the payment means currently included in the mobile terminal 100 may be output on the second area 850. When the user selects one of the thumbnail images 852, 854 and 856 output on the second area 850, the controller 180 may output the image 820 of the payment means corresponding to the user-selected thumbnail image on the first area 810.

The controller 180 may output the thumbnail images on the second area 850 in a distinguishing manner according to whether or not a specific payment means is available in the country where the mobile terminal 100 is currently located. That is, the third thumbnail image 856 corresponding to a third payment means may not be a credit card which is available in the country (England) where the mobile terminal 100 is currently located. In this instance, the controller 180, as illustrated in the second drawing of FIG. 8, may output a graphic object for notifying the unavailability of the third payment means on one area of the display unit 151 on which the third thumbnail image 856 corresponding to the third payment means is output. Accordingly, the user may recognize that the third payment means is currently unavailable.

Meanwhile, the controller 180 of the mobile terminal 100 disclosed herein may further output detailed information related to a currently-selected payment means on the payment means image 820 output on the first area 810. For example, the detailed information may be information related to clearing commission to be charged or points accumulation criteria when payment is made via the currently-selected payment means in the country where the mobile terminal 100 is currently located. Also, the detailed information may further include benefit-related information when the currently-selected payment means provides benefits for the currently-located country of the mobile terminal 100. The benefit-related information may be discount information or points-related information when points are additionally saved.

The benefit-related information may further include information related to a specific region or an event involved in the country where the mobile terminal 100 is currently located. For example, the controller 180 may further include information related to a tax exemption benefit of a duty-free shop or the like, or information related to a specific benefit (e.g., an additional discount or additional points saving) which is provided at a specific region. Or, when a specific event (e.g., a festival, a sports game, etc.) is held in the currently-located country, the controller 180 may further output related information. In this instance, if the corresponding payment means provides the specific benefit involved in the specific event, the controller 180 may further output information related to the benefit (e.g., an additional discount given when paying for a ticket for a specific socket game using the corresponding payment means during the World cup).

The controller 180 of the mobile terminal 100 disclosed herein may output on the display unit 151 various benefit information provided by each payment means with respect to the currently-located country of the mobile terminal 100. The controller 180 may also allow the user to select at least one payment means.

The benefit information output on the payment means image 820 may include discount information or clearing commission information on the basis of a region or spent money with respect to the corresponding payment means. Such information may allow the user to select a different payment means as 'main payment means' on the basis of a region, spent money or a duration.

In this instance, when the mobile terminal 100 enters a specific region in the currently-located country, the controller 180 may change 'main payment means' to a specific payment means according to a user selection. Or, when a total amount of spent money or spent money for a single case or item exceeds a preset amount of money, the controller 180 may change 'main payment means' to a specific payment means according to a user selection. Or, after a lapse of a duration designated in a currently-set main payment means, the controller 180 may change 'main payment means' to another payment means which has been preset by the user.

When the main payment means is changed to one of the plurality of payment means included in the mobile terminal 100, the controller 180 may output a notification message 860 to notify the change of the main payment means, as illustrated in the fourth drawing of FIG. 8. Also, the controller 180 may notify the change of the main payment means to the user in a manner of outputting vibration or an audio signal at the same time of outputting the notification message 860.

Meanwhile, FIG. 8 exemplarily illustrate that the plurality of payment means are output, and the notification message 860 for notifying the change of the main payment means is output when one of the plurality of payment means is selected by the user. However, the notification message 860 may also be output every time when the main payment means is changed, as well as the selection of the one payment means. That is, in addition to those examples illustrated in FIG. 8, the notification message 860 and/or an alarm or vibration may be output even when the main payment means is automatically changed according to a different setting for the region, spent money or duration.

FIG. 9 is an exemplary view illustrating an example in which a payment means is automatically changed to a payment means available in a country where a mobile terminal 100 is located during roaming.

First, a first drawing of FIG. 9 illustrates an example of identifying a currently-located country of the mobile terminal 100 based on a roaming guide message received from a specific originator in accordance with an embodiment disclosed herein.

For example, the 'specific originator' may refer to a mobile phone carrier corresponding to a home network of the mobile terminal 100. That is, when roaming occurs, a mobile phone carrier which provides a communication network used by a subscriber or a user of the mobile terminal 100 may transmit a message (roaming guide message) 904 for notifying that the user is currently unable to use the communication network of the home network due to overseas roaming and thus has to use a communication network of a foreign country. In addition to the roaming guide message, the mobile phone carrier may transmit a message (roaming fee message) 902 for notifying expensive rates charged for roaming. Those messages 902 and 904 may be output on the display unit 151 of the mobile terminal 100. This example is illustrated in the first drawing of FIG. 9.

In this instance, the controller 180 may identify a currently-located country of the mobile terminal 100 through the messages 902 and 904. For example, the controller 180 may detect overseas roaming of the mobile terminal 100 through the roaming guide message 904 of those messages 902 and 904 illustrated in the first drawing of FIG. 9. The controller 180 may identify the currently-located country of the mobile terminal 100, namely, 'England' in a manner of recognizing or checking text included in the roaming fee message 902.

In this instance, the controller 180 may search for a payment means available in the currently-located country of the mobile terminal 100, namely, 'England' among the payment means currently included in the mobile terminal 100. As illustrated in a second drawing of FIG. 9, when only a first payment means is present as an available payment means, the controller 180 may indicate the availability of only the first payment means using thumbnail images output on the second region 850.

That is, as illustrated in the second drawing of FIG. 9, the controller 180 may output graphic objects on thumbnail images 854 and 856 corresponding to the other second and third payment means, except for a first thumbnail image 852 corresponding to the first payment means, so as to indicate that the other second and third payment means are unavailable. Or, the controller 180 may output only the first thumbnail image 852 corresponding to the currently-available payment means, namely, the first payment means on the second area 850.

In this manner, when there is only one available payment means, the controller 180 may, of course, immediately select the one available payment means as 'main payment means' even without a user selection. In this instance, even without a user selection, as illustrated in a third drawing of FIG. 9, a message 860 notifying the change of the main payment means may immediately be output on the display unit 151.

Figure 10A:
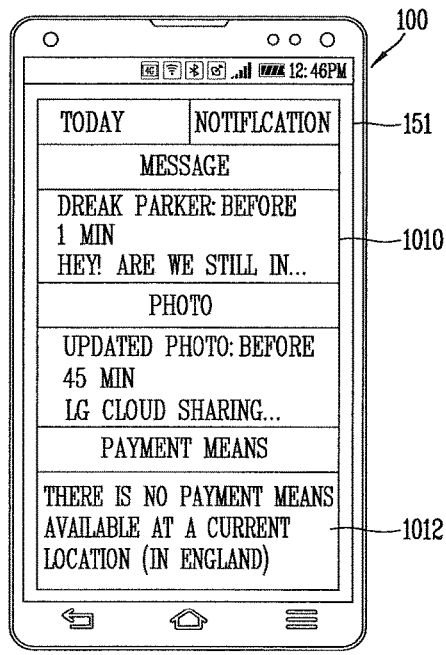
FIGS. 10A-10C are exemplary views illustrating examples of outputting notification information when there is no payment means available in a country that a mobile terminal is currently located.
Figure 10B:
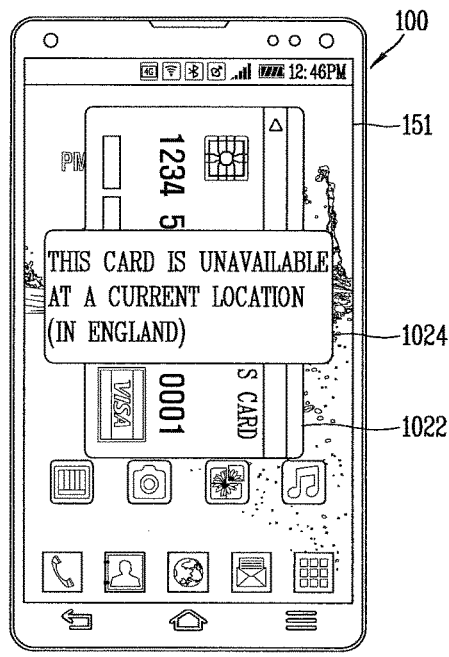
Figure 10C:
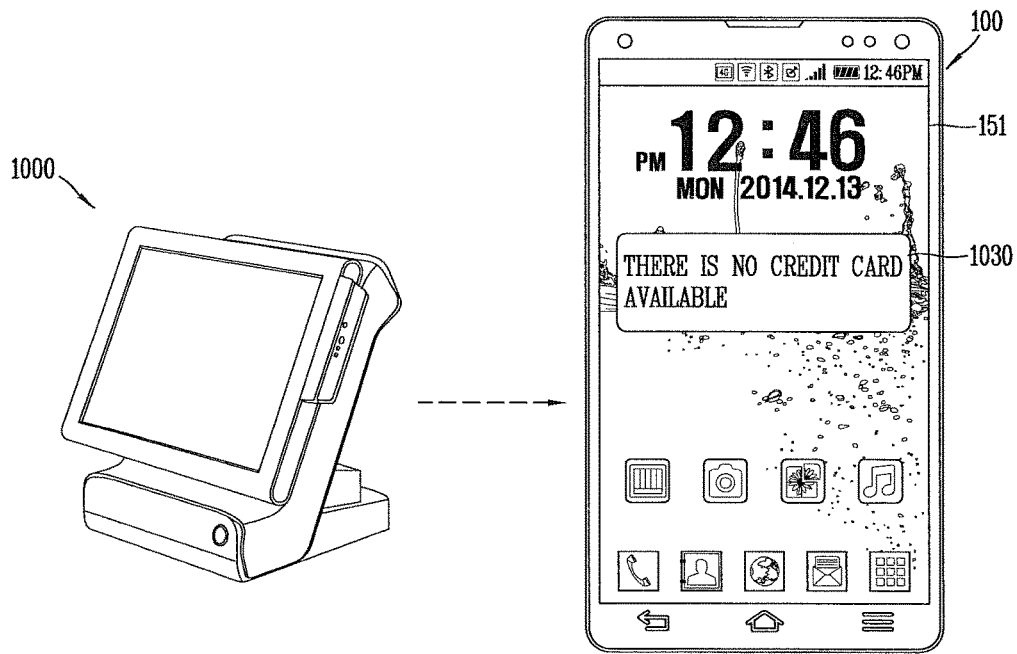

However, unlike the example of FIG. 9, when there is no available payment means in the mobile terminal 100 among those payment means currently included in the mobile terminal 100, the controller 180 may indicate this in various manners. FIGS. 10A-10C are exemplary views illustrating examples of outputting information related to non-presence of an available payment means when any payment means to be available in a currently-located country is not included in the mobile terminal 100 disclosed herein.

For example, as illustrated in FIG. 10A, the controller 180 may output information for notifying the non-presence of the available payment means on an area for outputting various status information (indicator information) of the mobile terminal 100, namely, an indicator area. In this instance, when indicator information 1010 is output in response to a touch gesture or a touch & drag input applied by the user, the controller 180 may output information 1012 for notifying the non-presence of the payment means, which is available at the current location of the mobile terminal 100, on the display unit 151, along with currently received messages or various notification information.

Or, when information related to a payment means, which has been set by the user as the main payment means, is output, the controller 180 may output information for notifying that no payment means is available at the current location of the mobile terminal 100. That is, when information 1022 related to the main payment means is output, as illustrated in FIG. 10B, in response to a touch gesture or a touch & drag input applied by the user, the controller 180 may output on the display unit 151 a message 1024 for notifying that the currently-set main payment means is unavailable at the current location of the mobile terminal 100.

As aforementioned, in the mobile terminal 100 disclosed herein, as illustrated in FIG. 9, if any of payment means is available at the current location of the mobile terminal 100, the available payment means may automatically be selected. Therefore, when the message 1024, as illustrated in the second drawing of FIG. 10B, is output, the user can recognize that there is no payment means available at the current location of the mobile terminal 100.

Meanwhile, when a preset specific device is present near the mobile terminal 100 disclosed herein, the mobile terminal 100 may output information for notifying non-presence of a payment means available at the current location. That is, as illustrated in FIG. 10C, when a payment terminal 1000 is sensed within a preset distance from the mobile terminal 100, the controller 180 may output a message 1030 for notifying non-presence of a currently-available payment means on the display unit 151.

FIGS. 10A-10C illustrate examples of outputting notification information for notifying non-presence of an available payment means in a specific case by employing a specific method. However, the notification information may also be continuously output on the display unit 151 until an available payment means is set, in order to facilitate the user to fast recognize and deal with such state.

Meanwhile, the controller 180 of the mobile terminal 100 disclosed herein, as illustrated in FIGS. 10A-10C, may not only merely output the information notifying the non-presence of the available payment means, but also further output guide information for the user to deal with this. For example, the guide information may be information to help the user have a new payment means issued or change a previously-set (existing) payment means.

Figure 11A:
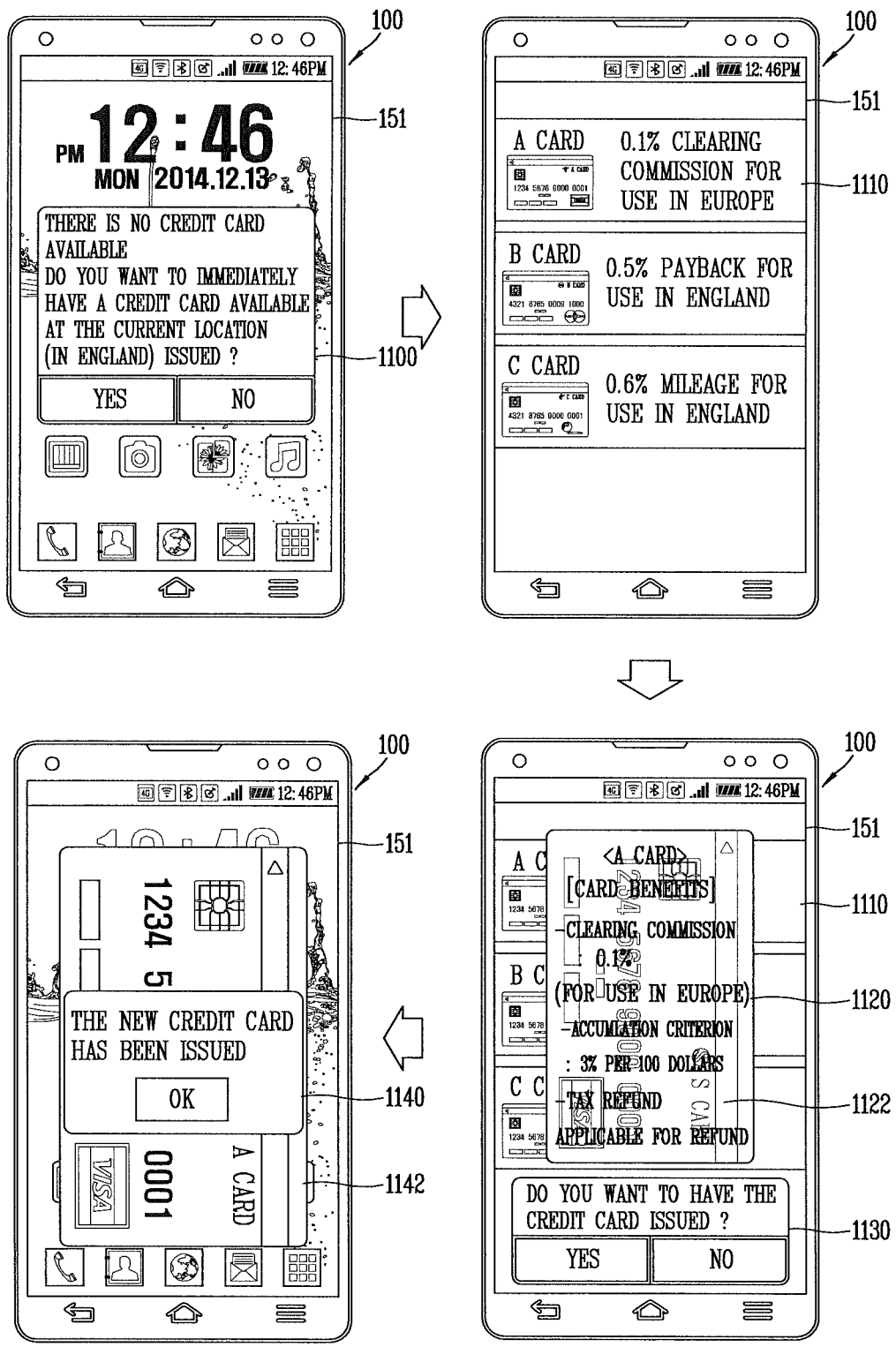
FIGS. 11A and 11B are exemplary views illustrating an example of having new payment means issued or changing an existing payment method when there is no payment means available in a country that a mobile terminal is currently located.
Figure 11B:
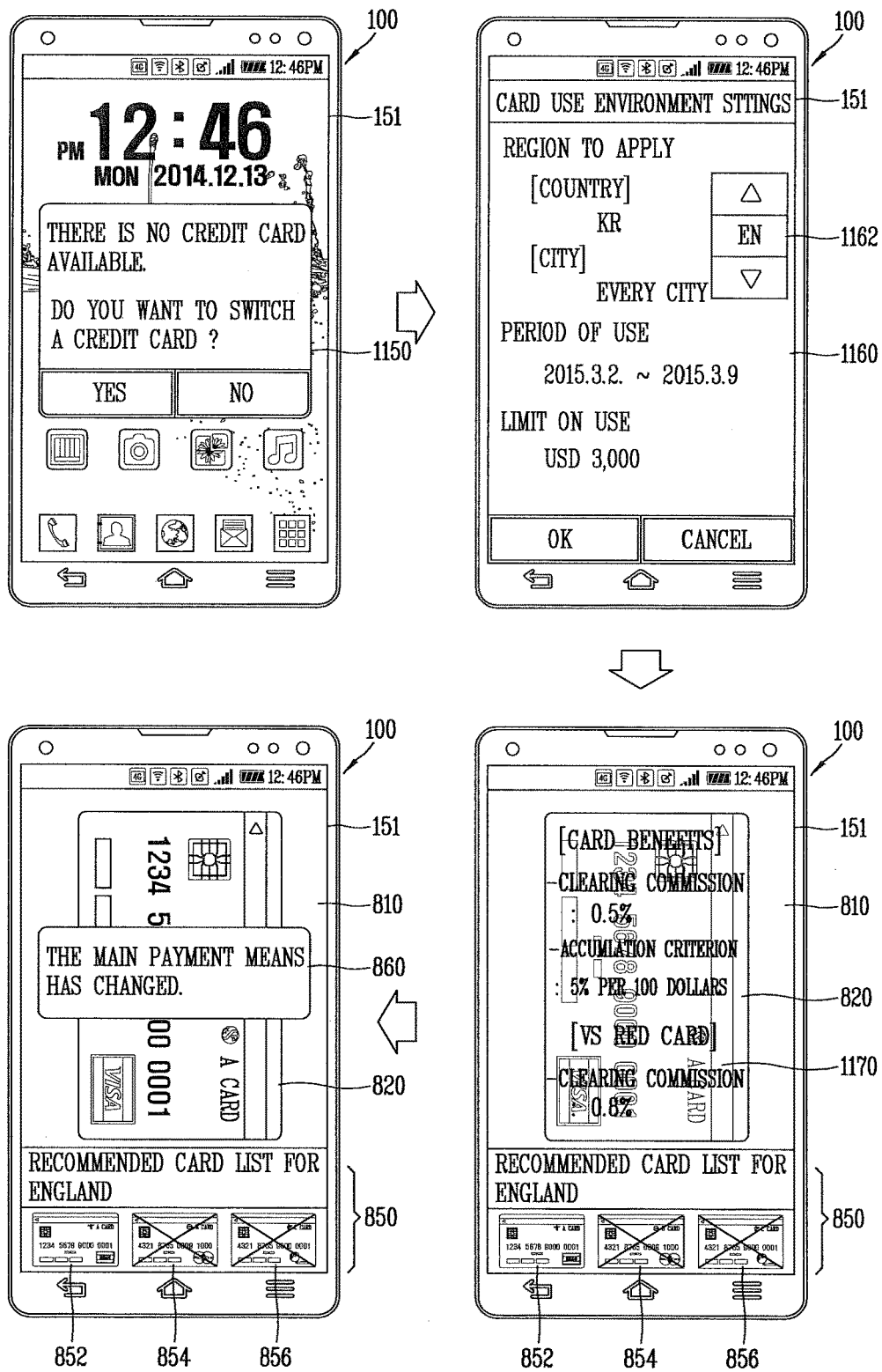

FIGS. 11A and 11B are exemplary views illustrating an example in which a user has a new payment means issued or changes a previously-set payment means when there is no payment means available in a currently-located country of the mobile terminal 100 disclosed herein.

First, FIG. 11A illustrates an example of allowing the user to have a new payment means issued.

A first drawing of FIG. 11A illustrates an example in which non-presence of any payment means available at a current location is indicated and a payment means absence message 1100 is output for the user to select whether or not to have a new payment means issued at the current location. When the user selects to have the new payment means issued through the payment means absence message 1100, the controller 180 may output various related guide information on the display unit 151. Second through fourth drawings of FIG. 11A illustrate examples of guide information output while a new payment means is issued.

When the user selects to have the new payment means issued through the payment means absence message 1100, the controller 180 may receive information related to several payment means which can be immediately issued for the user. For example, the controller 180 may receive information related to such payment means from a preset external server (e.g., a server pre-designated by a mobile phone carrier of a home network according to a currently-located country of the mobile terminal 100, etc.) or from a bank or credit card company which is accessed through a currently-accessed wireless communication network. As illustrated in the second drawing of FIG. 11A, the received information related to the payment means may be output on the display unit 151.

As illustrated in the second drawing of FIG. 11A, those received information related to the payment means may include images of the payment means, respectively, in a form of a thumbnail image, and also include brief information related to services or benefits provided by each payment means. In this state, when the user selects one payment means, the controller 180 may output more detailed information related to the selected payment means on the display unit 151. A third drawing of FIG. 11A illustrates this example.

For example, when the user selects a thumbnail image 1110 corresponding to a card A from information related to several payment means illustrated in the second drawing of FIG. 11A, the controller 180, as illustrated in a third drawing of FIG. 11A, may output an image 1120 of the card A corresponding to the thumbnail image 1110 on the display unit 151. Information related to the card A may be output on an area of the display unit 151 on which the image 1120 of the card A is output, in a manner that the user can recognize this. Here, the information related to the card A may include information related to services or benefits provided by the card A, namely, information related to a clearing commission rate, a discount rate, or a points accumulation rate. The information related to the card A may further include information related to benefits provided by the card A with respect to a specific region (e.g., information related to whether or not tax is refunded when the payment means is used at a duty-free shop, information related to an event held at a specific region, etc.).

The controller 180 may output a select menu 1130 such that the user can select to have one payment means issued on the display unit 151. In this instance, the select menu 1130 may be output along with an image (e.g., the reference number 1120) of a specific payment means and detailed information (e.g., a reference numeral 1122) involved in the specific payment means. Accordingly, the controller 180 may allow the user to compare information regarding benefits and services for each currently-issuable payment means, and immediately request for having one payment means issued.

When the immediate issue of the specific payment means is requested through the select menu 1130, the controller 180 may execute an authentication process and various related processes, in response to the request for the immediate issue. When those processes are completed, the controller 180, as illustrated in a fourth drawing of FIG. 11A, may output on the display unit 151 a message 1140 for notifying the completion of the issue of the new payment means, and information related to the issued payment means, namely, an image 1142 corresponding to the newly-issued payment means.

FIG. 11A merely illustrates an example that a payment means which can be transmitted to the mobile terminal 100 is issued. On the other hand, the mobile terminal 100 disclosed herein may also provide more various information related to the issue of the payment means. For example, the controller 180 of the mobile terminal 100 may output guide information for getting not only an electronic payment means but also a physical payment means, such as a real plastic IC card or a smart card, according to a user selection.

That is, the controller 180 may output on the display unit 151 information related to issuers which can issue the physical payment means to the user according to the user selection. In this instance, the information related to the issuers may include information regarding a path from a user's current location to locations of issuers which can issue the payment means selected by the user.

Unlike the issue of the new payment means, the controller 180 may allow the user to select a change of an existing payment means. For example, the controller 180 may indicate absence of a payment means available at a current location, and output a payment means absence message 1150 for the user to select a change of settings of an existing payment means. When the change of the settings of the existing payment means is selected by the user through the payment means absence message 1150, the controller 180 may output various related guide information on the display unit 151. Second to fourth drawings of FIG. 11B illustrate examples of guide information output during the process of having the new payment means issued.

When the change of the settings of the existing payment means is selected through the payment means absence message 1150, the controller 180, as illustrated in the second drawing of FIG. 11B, may output use environment information currently set for one payment means selected by the user on the display unit 151. The use environment information may be provided from a bank or credit card company corresponding to the selected specific payment means.

For example, as illustrated in use environment information 1160 of the second drawing of FIG. 11B, when a country is set as 'South Korea,' a currently-selected payment means may be set to be available only in 'South Korea' (e.g., restriction of overseas use). In this instance, according to a user selection, the controller 180 may release the setting of the overseas use restriction, or add a currently-located country of the mobile terminal 100, namely, 'England' as a country in which the currently-selected payment means is available. The controller 180 may further set a period of use, a limit on use and the like according to the user selection. When the user selects 'OK' on the use environment information 1160, the controller 180 may transmit the use environment setting information currently set by the user to the bank or credit card company corresponding to the selected specific payment means.

Meanwhile, use environment settings of the currently-selected payment means may be changed according to the transmitted use environment setting information. For example, when the user is authenticated, the bank or credit card company which has received the use environment setting information may change the environment setting of the currently-selected specific payment means according to the received use environment setting information. When the use environment is changed, the bank or credit card company may transmit information related to services and benefits, which are involved in the currently-selected payment means, in the currently-located country of the mobile terminal 100 according to the changed use environment.

The service and benefit-related information involved in the currently-selected payment means, received from the bank or credit card company, may be output on the display unit 151. For example, the controller 180, as illustrated in the third drawing of FIG. 11B, may output service and benefit-related information involved in the currently-selected payment means on an area of the display unit 151, on which an image 820 of the currently-selected payment means is output. In this state, when the user sets the currently-selected payment means as a main payment means, as illustrated in the fourth drawing of FIG. 11B, the controller 180 may output a message 860 notifying the change of the main payment means on the display unit 151.

FIG. 11B illustrates the example of merely changing the setting of the payment means with the restriction of overseas use set therefor, but the setting of the payment means may further include a renewal of an expiration date. Accordingly, the expiration date can be renewed based on the transmission of the use environment setting information, and thus even the payment means whose expiration date is near at a hand can be converted into an available payment means.

According to the foregoing description, the controller 180 of the mobile terminal 100 can recommend a payment means, which is the most appropriate to be available in a currently-located country of the mobile terminal 100, to the user among the plurality of payment means stored in the mobile terminal 100 according to various methods. Various information related to each payment means may be output for the recommendation.

Figure 12A:
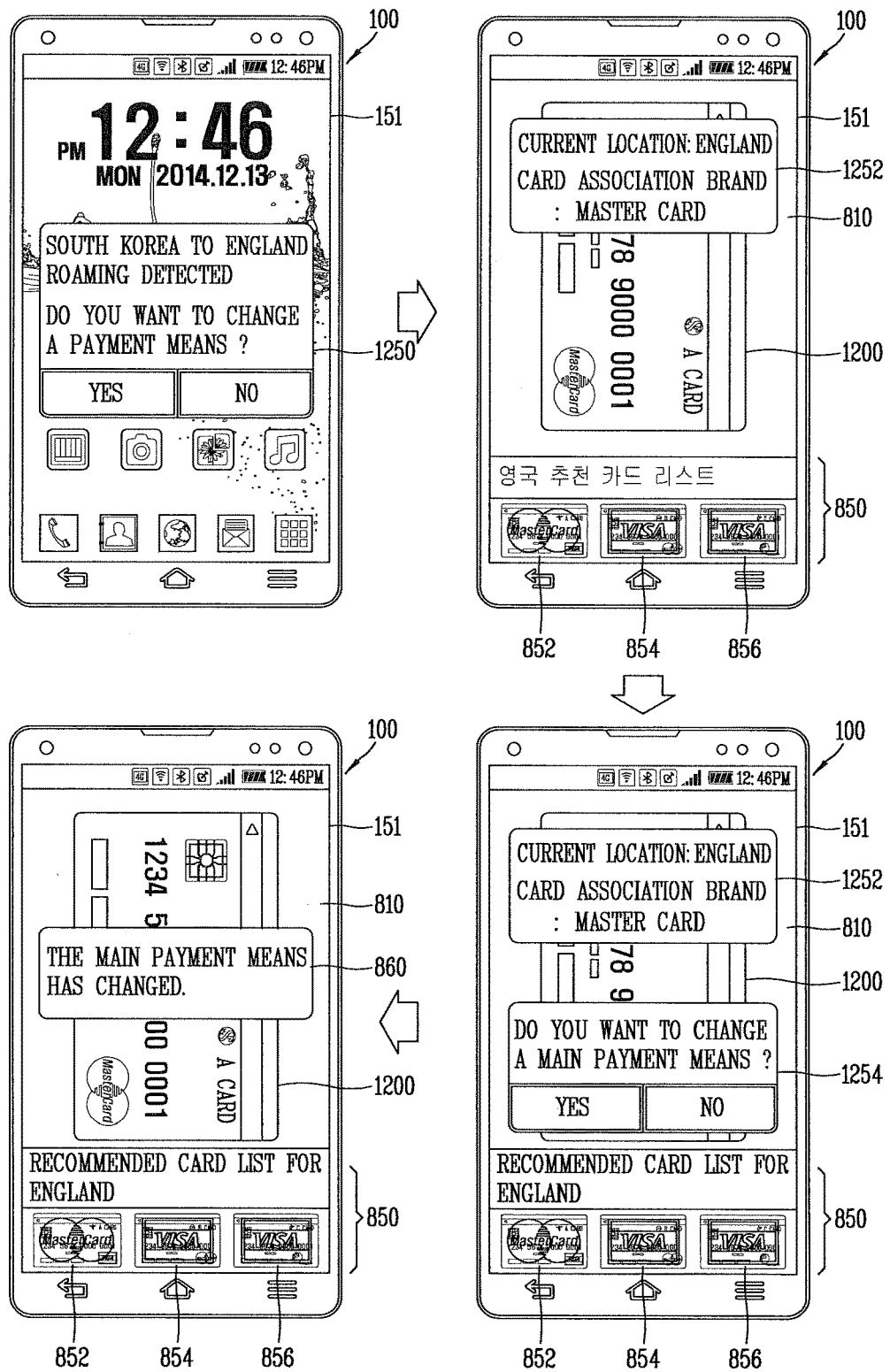
FIG. 12A is an exemplary view illustrating an example of changing payment means according to an association brand of payment means acceptable in a country that a mobile terminal is currently located.
Figure 12B:
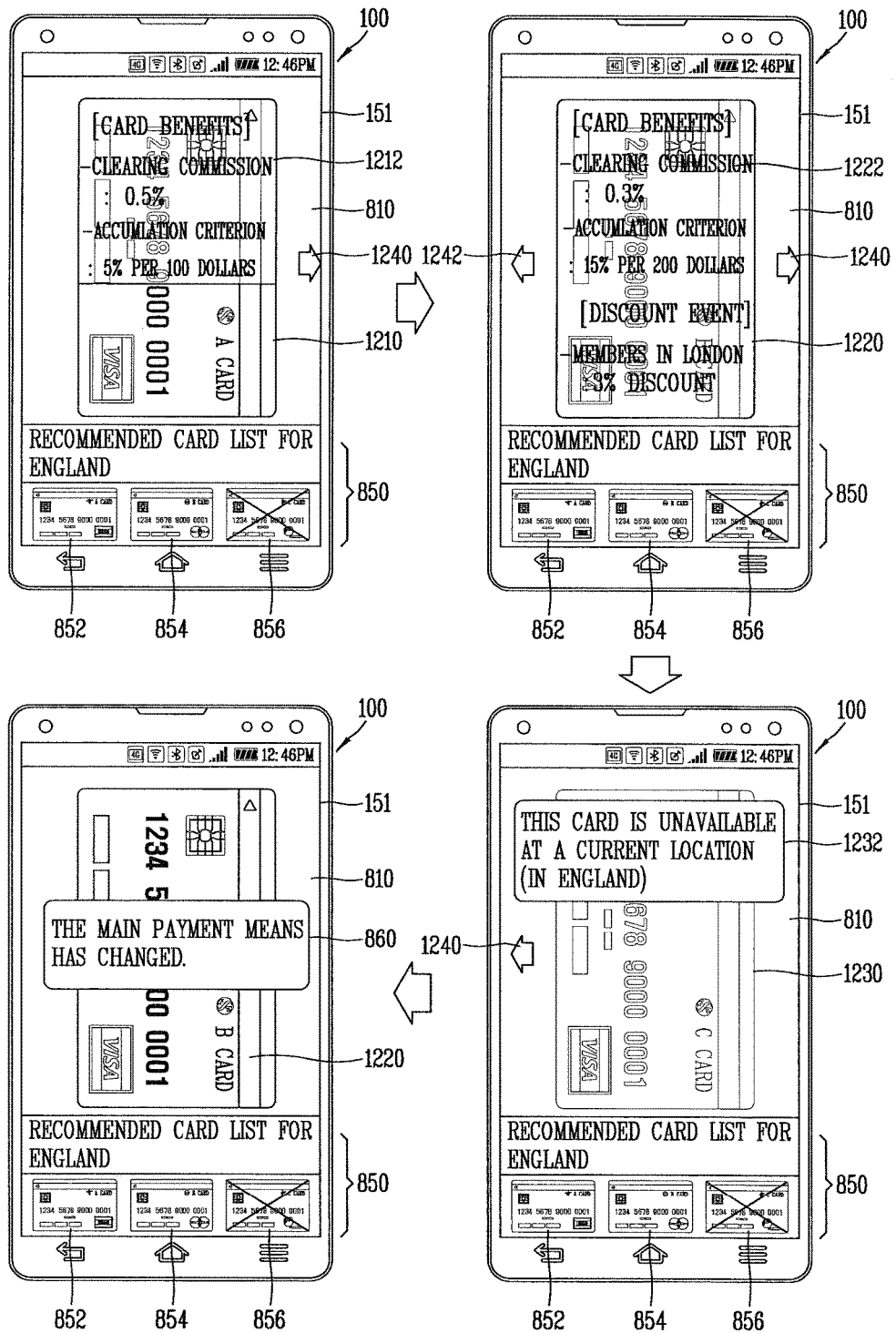
FIG. 12B is an exemplary view illustrating an example of changing payment means on the basis of benefits provided by each payment means according to a country that a mobile terminal is currently located.

In this instance, various criteria may be provided for recommending the payment means. Examples of the various criteria may include a card association brand acceptable in the currently-located country of the mobile terminal 100, a clearing commission rate or a discounts rate. Also, the criterion may be a type of currency and an exchange rate, which are commonly used in the currently-located country of the mobile terminal 100. FIGS. 12A and 12B are exemplary views illustrating an example of recommending at least one payment means to a user according to a currently-located country of the mobile terminal 100, and an example of showing information related to each payment means to the user for the recommendation, in the mobile terminal 100 disclosed herein.

First, FIG. 12A is an exemplary view illustrating an example of recommending and changing a payment means according to a card association brand of a payment means acceptable in a country that a mobile terminal 100 is currently located.

A first drawing of FIG. 12A illustrates an example in which the mobile terminal 100 disclosed herein detects overseas roaming according to a user's movement, and outputs information regarding to an identified country. In this instance, the controller 180, as illustrated in the first drawing of FIG. 12A, may output on the display unit 151 notification information 1250 for notifying the detected overseas roaming to the user. The notification information 1250 may include a menu for the user to select a change of payment means.

When the change of payment means is selected by the user through the menu included in the notification information 1250, the controller 180, as illustrated in a second drawing of FIG. 12A, may output information 1252 related to a card association brand which is acceptable in a country (e.g., 'England') where the mobile terminal 100 is currently located. The controller 180 may output on the display unit 151 an image 1200 of a payment means having the same brand as the card association brand acceptable in the currently-located country of the mobile terminal 100, among those payment means prestored.

In this instance, as illustrated in the second drawing of FIG. 12A, when the card association brand acceptable in 'England' is 'master card,' the controller 180 may output the image 1200 of a payment means whose card association brand is 'master card' on the display unit 151. The controller 180 may output information related to the card association brand, with respect to each of thumbnail images 852, 854 and 856 corresponding to the plurality of payment means.

Meanwhile, when the image 1200 of the payment means having the same brand as the card association brand acceptable in the currently-located country of the mobile terminal 100 is output, the controller 180 may output a select menu 1254 for the user to select whether or not to set the payment means with the image currently output on the display unit 151 as a main payment means. When the user selects the change of the main payment means through the select menu 1254, the controller 180 may output the image 1200 of the payment means selected as the main payment means, and a message 860 for notifying the change of the main payment means on the display unit 151.

FIG. 12A has illustrated the example case where a card association brand acceptable in a currently-located country of the mobile terminal 100 is one, and a payment means having the same brand as the card association brand is one. That is, the card association brand acceptable in the currently-located country may also be in plurality. And, a plurality of payment means having the brand of the same card association may also be stored in the mobile terminal 100.

Accordingly, there may be a plurality of payment means having the same brand as at least one card association brand acceptable in a currently-located country of the mobile terminal 100. In this instance, the controller 180 may output information related to the plurality of payment means having the same brand in a manner of being distinguished from other payment means having different brands.

For example, the controller 180 may output information regarding payment means (hereinafter, referred to as first payment means), which have the same brand as a brand acceptable in a currently-located country of the mobile terminal 100, on a different area of the display unit 151 from payment means (hereinafter, referred to as second payment means) without having the same brand. In this instance, the controller 180 may output the information related to the first payment means on the first area 810, and the information related to the second payment means on the second area 850.

Or, the controller 180 may output thumbnail images corresponding to the first payment means in a manner of arranging them before thumbnail images corresponding to the second payment means. In this instance, each thumbnail image may output thereon a card association brand, as illustrated in the second drawing of FIG. 12A, such that the thumbnail images corresponding to the first payment means can be distinguished from the thumbnail images corresponding to the second payment means.

Or, the controller 180 may output only the thumbnail images corresponding to the first payment means on the second area 850, and output only an image corresponding to one of the first payment means on the first area 810. That is, the thumbnail images corresponding to the second payment means and the images corresponding to the second payment means may not be output on the display unit 151.

Accordingly, the mobile terminal 100 disclosed herein may output the payment means having the same brand as the card association brand acceptable in the currently-located country thereof, in a manner that the user can identify those payment means. This may also facilitate the user to select the payment means having the same brand. In this instance, when there is one payment means having the same brand as the card association brand acceptable in the currently-located country of the mobile terminal 100, the controller 180 may, of course, automatically change a payment means to the only one payment means having the same brand.

Or, when there are a plurality of payment means having the same brand as the card association brand acceptable in the currently-located country of the mobile terminal 100, the controller 180 may select one payment means according to a preset criterion and set the selected one payment means directly as 'main payment means.' Here, the preset criterion may be a clearing commission, a discount rate, a point accumulation rate and the like. That is, the controller 180 may immediately set a payment means, which has the lowest clearing commission, or the highest discount rate or point-saving rate, as 'main payment means' according to a user selection, among the payment means having the same brand as the card association brand acceptable in the currently-located country of the mobile terminal 100. Here, the controller 180 may, of course, compare the discount rate or the point-saving rate for each payment means by converting it into a reference value.

Meanwhile, unlike the example illustrated in FIG. 12A, the user may directly check service-related information and benefit-related information involved in each card, and select a specific payment means accordingly. FIG. 12B is an exemplary view illustrating an example in which the mobile terminal 100 recommends and changes a payment means based on benefits provided by each payment means according to a currently-located country thereof in this case. Hereinafter, description will be given under assumption that each payment means included in the mobile terminal 100 has the same brand as one of card association brands acceptable in a currently-located country.

In this instance, when the user selects a change of a payment means through a menu included in notification information for notifying overseas roaming to the user, the controller 180 may output thumbnail images 852, 854 and 856 corresponding to the payment means stored in the mobile terminal 100 on the second area 850 of the display unit 151, and an image corresponding to a specific payment means on the first area 810 of the display unit 151.

That is, as illustrated in a first drawing of FIG. 12B, the controller 180 may output on the display unit 151 an image 1210 of a first payment means corresponding to a first thumbnail image 852 among the thumbnail images 852, 854 and 856. The controller 180 may also output on the display unit 151 information 1212 related to services and benefits of the first payment means, which are involved in the currently-located country (e.g., 'England) of the mobile terminal 100. In this instance, the information 1212 related to the services and benefits of the first payment means may be semi-transparently output on an output area of the image 1210 of the first payment means, in a manner that the image 1210 of the first payment means can be recognized therethrough. Here, the information 1212 related to the services and benefits of the first payment means may include information related to a criterion of charging for a commission and a criterion for accumulating points with respect to the first payment means.

In this state, the controller 180 may detect a user input applied to one of the thumbnail images 852, 854 and 856 output on the second area 850, or a user input applied to a graphic object 1240 indicating information related to the next payment means. Information related to a different payment means may be output on the display unit 151 according to a detected user input.

For example, in the state illustrated in the first drawing of FIG. 12B, upon detecting a user input applied to the graphic object 1240 corresponding to the next payment means or the second thumbnail image 854 of the thumbnail images 852, 854 and 856, the controller 180 may output an image 1220 of the second payment means corresponding to the second thumbnail image 854 on the display unit 151. The controller 180 may also output on the display unit 151 information 1222 related to services and benefits of the second payment means, involved in the currently-located country (e.g., 'England') of the mobile terminal 100.

In this instance, as illustrated in a second drawing of FIG. 12B, the information 1222 related to services and benefits of the second payment means may be semi-transparently output on the output area of the image 1220 of the second payment means, in the manner that the image 1220 of the second payment means can be recognized therethrough. Here, the information 1222 related to the services and benefits of the second payment means may include information related to a criterion of charging for a commission, a criterion for accumulating points with respect to the second payment means, discount information involved in the specific region or a specific event, and the like.

Accordingly, the user may compare services, discount criteria or benefits provided by each payment means. When the user selects one payment means according to the comparison result, the controller 180, as illustrated in a fourth drawing of FIG. 12B, may output an image of the currently-selected payment means (e.g., the image 1220 of the second payment means) on the display unit 151, and also output the message 860 for notifying the change of the main payment means.

On the other hand, when the user selects a payment means (e.g., a third payment means) which is unavailable, namely, is restricted from being used in the currently-located country of the mobile terminal 100, the controller 180 may output a message for notifying this on the display unit 151. That is, as illustrated in a third drawing of FIG. 12B, the controller 180 may output a message 1232 for notifying that the currently-selected card is unavailable in the current location (e.g., 'England'). Also, the controller 180 may output an image 1230 of the currently-selected third payment means to be distinguished from the image 1210 of the first payment means and the image 1220 of the second payment means illustrated in the first and second drawings of FIG. 12B, thereby notifying the unavailability of the third payment means.

Meanwhile, the foregoing description has been given of the example that the user compares service information and benefit information of each payment means and selects one payment means according to the comparison result, but the controller 180 may, of course, recommend at least one payment means to the user according to a specific condition or criterion. In this instance, the controller 180 may compare service information related to each payment means according to a preset criterion. The preset criterion may be a discount rate on the basis of a region or spent money.

For example, the controller 180 may compare service information related to each payment means based on a clearing commission. The controller 180 may output the plurality of payment means by arranging them in the order of the lowest to the highest clearing commission. That is, the controller 180 may arrange the plurality of payment means in the order of the lowest to the highest clearing commission, and output thumbnail images corresponding to the payment means, respectively, in the arrangement order. Also, the controller 180 may output images corresponding to the plurality of payment means, respectively, on the first area 810 in the output order of the thumbnail images. Accordingly, information regarding each payment means can be output in the order of the lowest to the highest clearing commission in the currently-located country of the mobile terminal 100.

Similar to this, the controller 180 may output the plurality of payment means by arranging them in the order of the highest to the lowest discount rate or point accumulation rate. In this instance, the controller 180 may calculate each discount rate or point accumulation rate based on a preset amount of money (e.g., 1, 10, 100 dollars), and arrange and output the plurality of payment means, starting from the highest to the lowest discount rate or point accumulation rate calculated.

Meanwhile, the controller 180 may, of course, may allow the user to preset a specific amount of money and compare a discount rate, a point accumulation rate or a clearing commission according to the preset amount of money, with respect to each payment means. In this instance, the controller 180 may compare the discount rate, the point accumulation rate or the clearing commission for each payment means, under assumption that a total amount of spent money is more than the preset amount of money or a one-time paid amount of money is more than the preset amount of money.

Therefore, under assumption that a total amount of spent money or a one-time paid amount of money is more than a predetermined amount of money, if there is a payment means whose discount rate, point accumulation rate or clearing commission is changed, the payment means may be compared with other payment means, based on the changed discount rate, point accumulation rate or clearing commission.

The controller 180 may arrange and output the plurality of payment means in the order of the highest to the lowest discount rate or point accumulation rate, or in the order of the lowest to the highest clearing commission. Therefore, when the total amount of spent money or the one-time paid amount of money is more than the preset amount of money, information (e.g., thumbnail images) related to each payment means may be arranged and output in the order of the highest to the lowest discount rate or point accumulation rate, or in the order of the lowest to the highest clearing commission.

In this state, when a specific payment means is selected, the payment means may be set to be used when the total amount of spent money or the one-time paid amount of money is more than the preset amount of money. That is, the controller 180 may set a plurality of payment means as 'main payment means' such that different payment means can be used when the total the total amount of spent money or the one-time paid amount of money is greater than and smaller than the preset amount of money, respectively.

Similar to this, a plurality of payment means may also be set as the main payment means according to a specific region. In this instance, the controller 180 of the mobile terminal 100 disclosed herein may allow the user to preset a specific region and compare, for each payment means, a discount rate, a point accumulation rate or a clearing commission at the preset region. The controller 180 may then compare the discount rate, the point accumulation rate or the clearing commission for each payment means at the preset region. Here, the controller 180 may also compare the discount rate or the point accumulation rate for each payment means in a manner of converting it into a reference amount of money.

Accordingly, when there is a payment means whose discount rate, point accumulation rate or clearing commission is changed according to a region, the payment means may be compared with other payment means based on the changed discount rate, point accumulation rate or clearing commission. The plurality of payment means may thus be arranged and output according to the comparison result. When one payment means is selected by the user, the payment means may be set to be used as a main payment means when the mobile terminal 100 is located within the specific region. That is, the controller 180 of the mobile terminal 100 disclosed herein can set a plurality of payment means as 'main payment means' such that a different payment means can be used according to a region in which the mobile terminal 100 is located.

Meanwhile, the foregoing description has been given of the example that the controller 180 of the mobile terminal compares a plurality of payment means according to clearing commissions or benefits, and output them according to the comparison result. However, the mobile terminal 100 may also recommend a more appropriate payment means to the user on the basis of a currency or an exchange rate acceptable in a currently-located country of the mobile terminal 100, as well as the clearing commission or benefits.

Figure 12C:
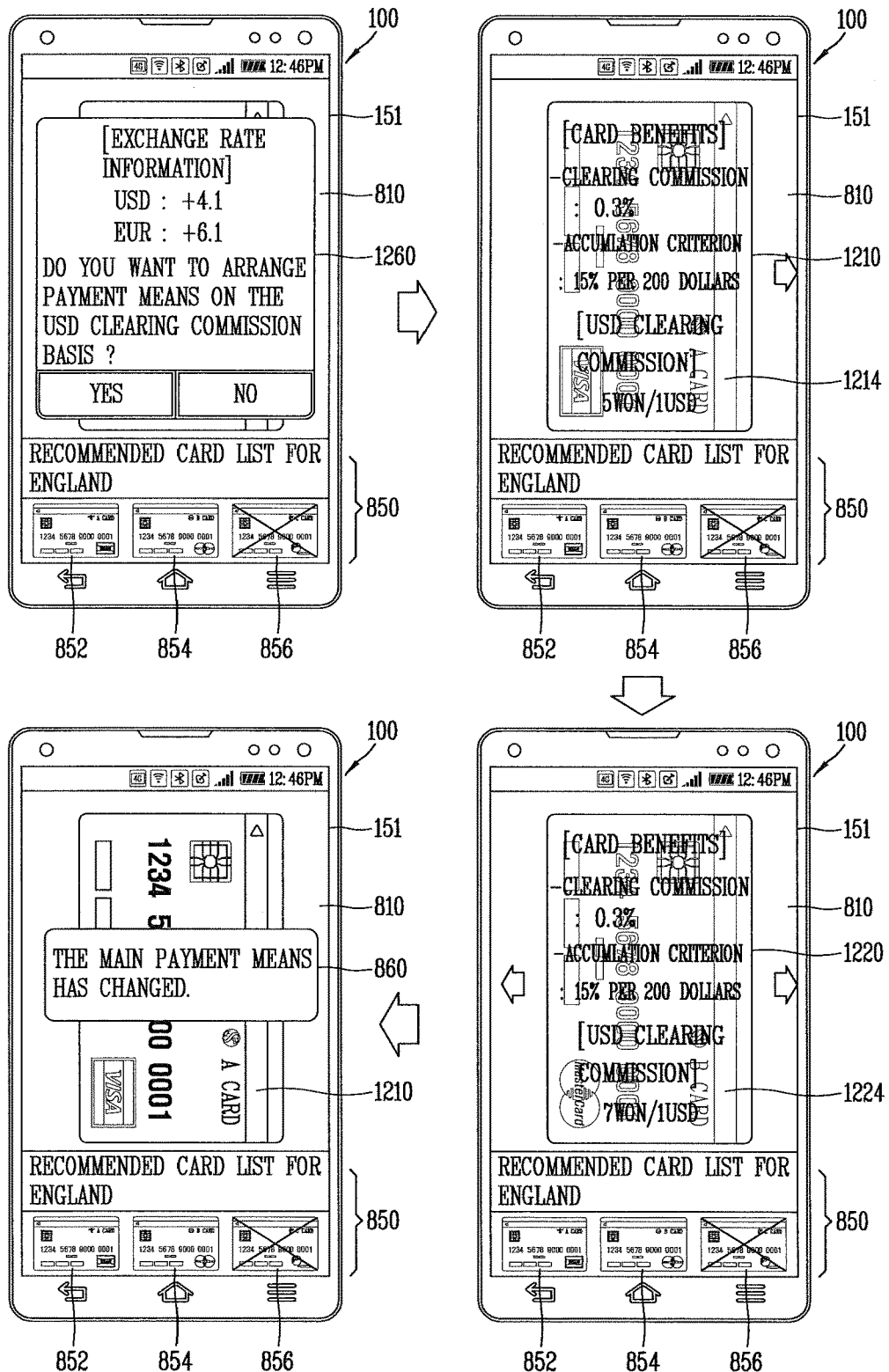
FIG. 12C is an exemplary view illustrating an example of changing payment means according to currencies and exchange rates acceptable in a country that a mobile terminal is currently located.

FIG. 12C illustrates an example in which the mobile terminal 100 disclosed herein recommends and changes a payment means according to a currency and an exchange rate acceptable in a currently-located country thereof.

The mobile terminal 100 disclosed herein may check a type of currency commonly used in a country that the mobile terminal 100 is currently located. For example, the controller 180 may receive such information from a preset external server or use currency information related to each country prestored in the memory 170.

For example, when a currently-located country of the mobile terminal 100 is 'England,' the controller 180 may check information related to money, namely, currencies acceptable in 'England.' If the currency acceptable in England is US dollar (USD) or Euro, the controller 180 may receive information related to exchange rates of the currencies (e.g., USD and Euro) from a preset external server. The controller 180 may then output the received exchange rate information on the display unit 151. A first drawing of FIG. 12C illustrates this example.

Referring to the first drawing of FIG. 12C, the controller 180 of the mobile terminal 100 disclosed herein may output the exchange rate information on the display unit 151. Therefore, on the display unit 151 may be output the currently-located country of the mobile terminal 100, USD and Euro as the money used in 'England' and exchange rate information 1260 related to the USD and Euro. Here, the exchange rate information may be an exchange rate at a time point that the check of the exchange rate is requested or an exchange rate closed on that day (in case where a check-requested time point has passed an exchange rate closing time). Or, the exchange rate information may be an average exchange rate for a preset period of time. In this instance, the controller 180 may calculate an average exchange rate for a user-set period of time, and output the calculated average exchange rate.

The controller 180 may then compare the checked exchange rates. For example, as illustrated in the first drawing of FIG. 12C, when the exchange rate of USD is '+4.1' and the exchange rate of Euro is '—6.1,' the controller 180 may allow the user to select the USD with the lower exchange rate as a type of money to be used for payment. When the payment is made with the money to which the lower exchange rate is applied, the user can get more gains and pay for less clearing commission, which is charged upon the payment.

When the user selects a currency with the lower exchange rate, the controller 180 may output a clearing commission rate according to the currently-selected currency for each payment means on the display unit 151. In this instance, the controller 180 may arrange the plurality of payment means in the order of the lowest to the highest clearing commission according to the currently-selected currency. Accordingly, the following description will be given of an example of an arrangement in the order of first payment means—second payment means. And it is assumed that a second drawing of FIG. 12C illustrates information corresponding to the first payment means, and a third drawing of FIG. 12C illustrates information corresponding to the second payment means.

In this instance, the controller 180 may output information related to a payment means which is first output of the arranged payment means. That is, as aforementioned, in the arrangement state of the first payment means—second payment means, the controller 180 may first output the information related to the first payment means on the display unit 151. In this instance, the controller 180, as illustrated in the second drawing of FIG. 12C, may output an image 1210 of the first payment means, and information 1214 related to the first payment means. Here, the information 1214 related to the first payment means may include a clearing commission rate with respect to the currently-selected currency, namely, USD.

In this instance, the user can directly select the payment means currently output on the display unit 151. The controller 180, as illustrated in a fourth drawing of FIG. 12C, may output on the display unit 151 the image 1210 of the currently-set payment means, namely, the first payment means, and a message 860 for notifying the completed change of the main payment means.

Meanwhile, in the state illustrated in the second drawing of FIG. 120, when the user selects another payment means, the controller 180 may also further output information related to the another payment means. That is, upon detecting a user input applied to a thumbnail image corresponding to the another payment means or a preset graphic object for outputting information related to the another payment means, the controller 180 may further output information related to the another payment means, in response to the user input.

Accordingly, when the user selects a thumbnail image corresponding to the second payment means, from information regarding the arranged payment means, namely, the thumbnail images corresponding to the payment means, respectively, an image 1220 corresponding to the second payment means and information 1224 related to the second payment means may be output. Here, the information 1224 related to the second payment means may include a clearing commission rate with respect to the currently-selected currency, namely, USD. The third drawing of FIG. 12C illustrates this example.

Meanwhile, the information related to each payment means (1212 and 1222 of FIG. 12B or 1214 and 1224 of FIG. 12C) may further include information related to a type of a currently-selected payment means. Also, additional information according to the type of payment means may be output in response to a user selection.

Figure 12D:
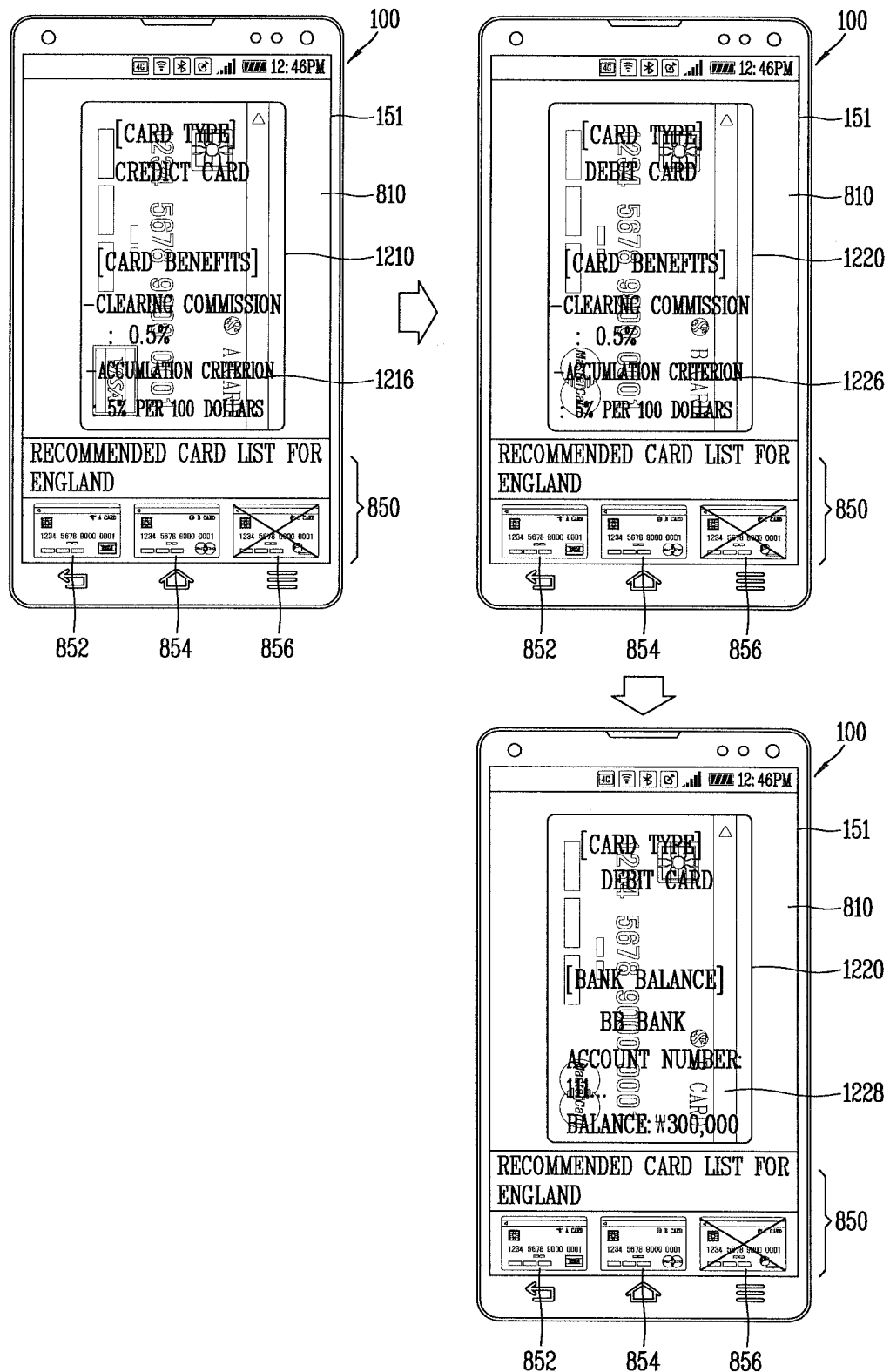
FIG. 12D is an exemplary view illustrating an example of further outputting additional information when selected payment means is a debit card in a mobile terminal.

FIG. 12D illustrates an example of further outputting additional information according to a type of a selected payment means, in the mobile terminal 100 disclosed herein. For example, the controller 180 may further output information indicating whether a payment means corresponding to an image currently output on the display unit 151 is a credit card or a debit card.

First and second drawings of FIG. 12D illustrate this example. For example, if the first payment means is a credit card, the controller 180, as illustrated in the first drawing of FIG. 12D, may output an indication, which indicates that the payment means corresponding to the image 1210 is the credit card, on information 1216 related to the first payment means, which is also output on an output area of the image 1210 of the first payment means.

On the other hand, when the second payment means is a debit card, the controller 180, as illustrated in the second drawing of FIG. 12D, may output an indication, which indicates that the payment means corresponding to the image 1220 is the debit card, on information 1228 related to the second payment means, which is also output on an output area of the image 1220 of the second payment means.

In this state, the controller 180 may further output additional information related to the payment means in response to a user selection. For example, as illustrated in the second drawing of FIG. 12D, when the output of the additional information is selected while the information related to the second payment means as the debit card is output, the controller 180 may further output account information related to the second payment means, as additional information involved in the second payment means.

The additional information may include information related to a bank and an account number associated with the second payment means, and a bank balance in the account linked to the second payment means. Therefore, the controller 180 may require for the user authentication in order to obtain the additional information. The authentication may be carried out in various manners, such as finger scan, password input, voice recognition and the like. When authentication information is input by the user, the controller 180 may transmit the authentication information to the bank involved in the second payment means, and obtain the additional information related to the second payment means according to the authentication result.

The obtained additional information may be output on the display unit 151. The third drawing of FIG. 12D illustrates the example in which the additional information 1228 including the information regarding the bank, the account and the bank balance, involved in the second payment means, is output on the display unit 151.

Although not illustrated, a remaining period until an expiration date of each payment means may further be included as a payment means recommendation criterion. In this instance, the controller 180 may arrange the plurality of payment means, except for the payment means, in the order of the longest to the shortest remaining period until the expiration date according to a user selection. Therefore, a payment means with a longer remaining period until the expiration date may be recommended to the user as a more appropriate payment means.

Meanwhile, the mobile terminal 100 disclosed herein may allow the user to preset a payment means to be used in a specific region or during a specific period. In this instance, the controller 180 may directly set the preset payment means as a main payment means when the mobile terminal 100 is detected as being located in a preset region or on a preset date.

FIG. 13 illustrates an example of presetting a payment means to be used in a specific overseas region in the mobile terminal 100 disclosed herein.

As illustrated in FIG. 13, a first drawing of FIG. 13 illustrates an example of a setting screen 1300 for the user to preset a region or period for using a specific payment means. As illustrated in the first drawing of FIG. 13, the controller 180 may allow the user to preset a region, a period, a place and the like to use the specific payment means.

Meanwhile, when such specific region and/or period are set, the controller 180 may select a payment means to be used in the preset region and/or during the preset period. The second drawing of FIG. 13 illustrates an example of a screen associated with the selection of the payment means.

Referring to the second drawing of FIG. 13, the controller 180 of the mobile terminal 100 disclosed herein may output information related to a plurality of payment means currently included in the mobile terminal 100 on one area 1360 of the display unit 151. Here, the information related to each payment means may be information indicating whether or not the payment means is available.

For example, the controller 180 may compare an expiration date of each payment means with the period preset in the first drawing of FIG. 13, to determine whether or not each payment means is available. In this instance, a payment means 1370 whose expiration date is included within the preset period may be determined as an unavailable payment means.

Also, a payment means which has been restricted from being used abroad or a payment means which does not support a currency or service (e.g., card association brand) acceptable in a corresponding country may be determined as an unavailable payment means. In this instance, the controller 180, as illustrated in the second drawing of FIG. 13, may output a message 1372 notifying the unavailability of the corresponding card on an output position of an image of the corresponding payment means.

Meanwhile, the controller 180 may recommend at least one payment means to the user. For example, when there is not any available payment means among payment means currently included in the mobile terminal 100, the controller 180 may output information related to a new payment means 1382 on one area 1380 of the display unit 151.

In this instance, the payment means recommended by the controller 180 may be at least one of a preset plurality of payment means according to criteria similar to those illustrated in FIGS. 12A to 12D. That is, the controller 180 may recommend one of a preset plurality of payment means according to whether the one payment means has a brand of a card association acceptable in the country preset in the first drawing of FIG. 13, and is available within the preset period in the country preset in the first drawing of FIG. 13. Also, the controller 180 may recommend a payment means in the order of the lowest to the highest clearing commission or from the highest to the lowest discount rate or point accumulation rate.

Here, the preset plurality of payment means may be designated from a specific external server. For example, such information related to the plurality of payment means may be received from a mobile phone carrier or at least one bank or credit card company.

When the specific payment means is preset, the controller 180 may set an authentication method associated with the currently-set specific payment means. FIGS. 14A and 14B are exemplary views illustrating examples of a user authentication method in this instance.

First, the controller 180 may output a screen for requesting for various authentication information to authenticate the user. That is, like an authentication information requesting screen 400 illustrated in (a) of FIG. 14A, when authentication information is input through a certificate digital signature act, a phone number authentication, or a finger scan method, the controller 180 may authenticate the user and make a payment.

Unlike those authentication methods, when the payment means is used for a designated usage in a designated region, the authentication method may be set in a different manner. For example, the controller 180 may select a method for authenticating a user by a faster authentication method (hereinafter, referred to as a simple authentication). Since the preset payment means is used in a preset region and/or for a preset usage, namely, at a place to be used, the user can be authenticated in a faster and more simplified manner even without a complicated authentication process, which may thus result in more facilitating a payment. (b) of FIG. 14A illustrates an example of setting such simple authentication method.

On the other hand, as illustrated in (a) of FIG. 14B, when a payment request is sent from a payment terminal 1000, the controller 180 of the mobile terminal 100 may request for different authentication information from the user according to whether or not the payment request is sent in a predefined region and/or according to a predefined usage.

That is, when the payment request is generated in a predefined region and/or according to a predefined usage, the controller 180 may perform the user authentication by one of the simple authentication methods set in (b) of FIG. 14B. Accordingly, as illustrated in (b) of FIG. 14B, the user authentication may be carried out merely by capturing the user's face, which may allow for a faster or more simple payment.

On the other hand, when the payment request is not generated in a predefined region and/or according to a predefined usage, the controller 180 may output a screen 1460 for requesting authentication information from the user, as illustrated in (b) of FIG. 14A. Accordingly, more stringent authentication may be carried out, in response to the payment request which is generated in the predefined region and/or according to the predefined usage. The payment may thus be restricted when the corresponding payment means is abused or abnormally used.

Figure 15:
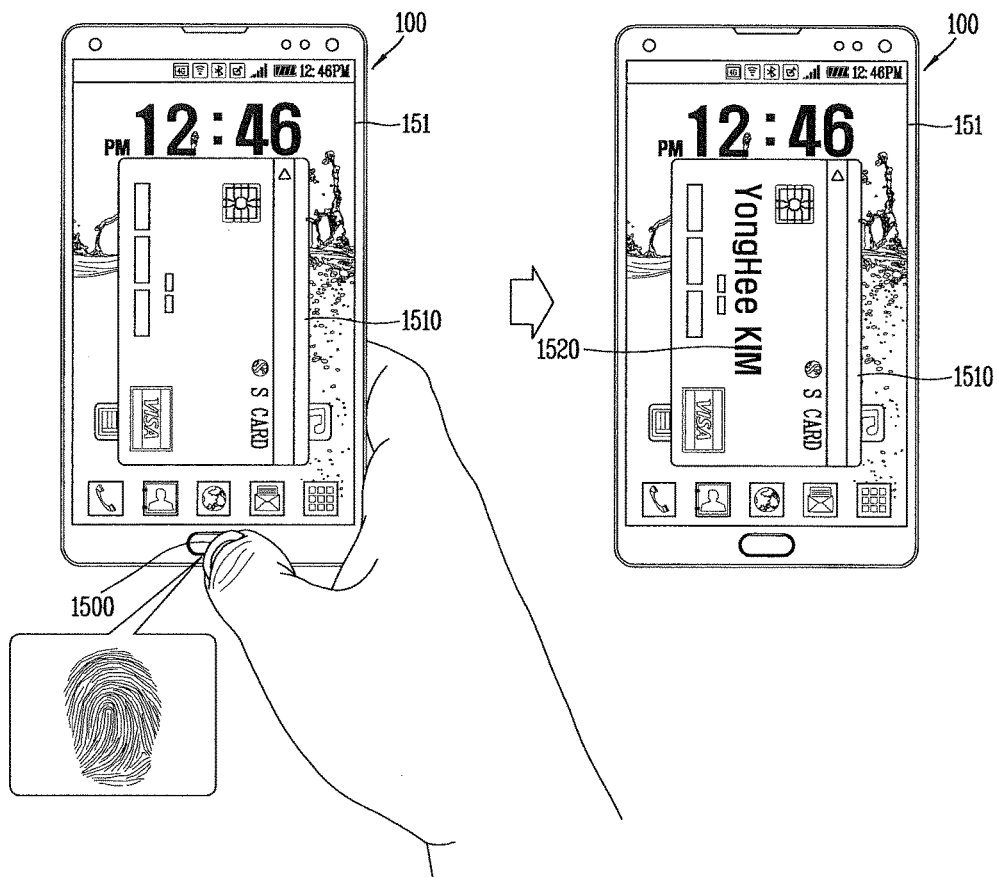
FIG. 15 is an exemplary view illustrating an example of further outputting information related to an authenticated user when the user is authenticated upon making a payment, in a mobile terminal.

Meanwhile, when the user authentication is completed, the controller 180 of the mobile terminal 100 disclosed herein may further output information related to the authenticated user. FIG. 15 is an exemplary view illustrating an example of further outputting information related to an authenticated user when the user is authenticated during a payment.

That is, as illustrated in a first drawing of FIG. 15, while an image 1510 for a selected payment means is output on the display unit 151, when the user inputs authentication information 1560, the controller 180 may transmit the authentication information 1560 to a bank or credit card company corresponding to the currently-selected payment means. When the user authentication is completed, the controller 180 may receive personal information related to the authenticated user from the bank or credit card company and output the received personal information on the display unit 151.

Here, the personal information related to the authenticated user may be a user's name. That is, as illustrated in a second drawing of FIG. 15, the controller 180 may output the name of the authenticated user on the image 1510 of the payment means output on the display unit 151. Accordingly, a seller may check the personal information involved in the authenticated user, to confirm whether or not another party (e.g., a purchaser) is the authenticated user of the payment means.

The second drawing of FIG. 15 has illustrated the example of outputting the user's name as the personal information related to the authenticated user. However, unlike this, various information may also be output. For example, the personal information regarding the authenticated user received from the bank or credit card company may include an image of the user's face, and the like. Accordingly, the seller may confirm whether or not the purchaser is a user who has been authenticated for the payment means, by way of checking the face of the purchaser.

On the other hand, when overseas roaming is detected, the controller 180 of the mobile terminal 100 disclosed herein may recommend or change a main payment means accordingly. Similar to this, when the user comes back to his or her own country, the controller 180 may recommend or change a main payment means accordingly. Here, the controller 180 may detect whether or not the mobile terminal 100 has accessed a home network other than a visited network, on the basis of received TAI information. When a PLMN ID included in the TAI information corresponds to a PLMN ID of the home network, the controller 180 may identify that a current location of the mobile terminal 100 is in a home country, namely, in the user's own country.

In this instance, since the location of the mobile terminal 100 is in the home country, namely, the user's own country, the controller 180 may output service or benefit information for each payment means under assumption that every card is available, and arrange and output the plurality of payment means according to a preset criterion.

However, without outputting or recommending information related to recommendation or payment means, the controller 180 may also recover 'main payment means' to a state before the occurrence of the overseas roaming. For example, once detecting overseas roaming, the controller 180 may store a payment means, which has been set as 'main payment means' before roaming, to correspond to the home network. After the main payment means is changed according to a visited network which is accessed due to the roaming, when an access back to the home network is detected, the controller 180 may recover the payment means corresponding to the home network to 'main payment means.' This is for the user to use the payment means familiar to the user after coming back to his or her own country.

Meanwhile, the foregoing description has been given of an example of detecting that the mobile terminal 100 currently accesses a visited network and identifying a currently-located country based on an MCC of a PLMN ID included in TAI information. However, in addition to this, the controller 180 of the mobile terminal 100 may also select any one payment means to set as a main payment means at a current location, according to a visited network identified by an MNC of the PLMN ID included in the TAI information.

For example, MNC network identification information for identifying a network corresponding to the MNC may include various types of information. That is, as aforementioned, the MNC network identification information may include information regarding a network corresponding to a specific MNC, and information regarding a card association brand acceptable in the network. Or, information related to a specific payment means corresponding to a specific network may also be included in the MNC network identification information.

The controller 180 of the mobile terminal 100 disclosed herein may control a payment means, which has a brand corresponding to a card association brand acceptable in a currently-accessed visited network, to be set directly as 'main payment means,' or a specific payment means corresponding to the currently-accessed visited network to be automatically set as 'main payment means.'

Meanwhile, when the specific payment means corresponding to the currently-accessed visited network is automatically set as the main payment means, the user can use more services provided by the identified visited network for the currently-set payment means, for example, a security channel service, an additional discount for an electronic purchase, and the like. Here, the electronic purchase may refer to a purchase carried out within the mobile terminal 100, in a manner that a payment is made according to a currently-set payment means by recognizing identification information, such as barcodes of a product which is sold at a currently-located region.

The foregoing description has been given of an example that MNC network identification information includes information on a network corresponding to a specific MNC and information on a card association brand acceptable in the network. However, the information on the card association brand may also be provided from the currently-accessed network. In this instance, the controller 180 of the mobile terminal 100 disclosed herein may request for information on card association brands acceptable in a currently-accessed network from an MME of the currently-accessed visited network. Upon receiving information on a specific card association brand from the MME of the visited network, the controller 180 may set a payment means, which has the same brand as the received card association brand, among a plurality of payment means, directly as a main payment means. In this instance, if the payment means having the same brand is in plurality, the controller 180 may set a payment means, which has the lowest clearing commission or the highest discount rate or point accumulation rate, among a plurality of payment means, directly as the main payment means according to a preset criterion.

The foregoing description has been given of exemplary operations executed on a general communication network, but all of the aforementioned communication processes or embodiments may also be implemented through a specific communication network of a visited network that the mobile terminal 100 currently accesses.

For example, when an access to a visited network is detected, the controller 180 may receive a payment means acceptable in the visited network from an MME of the visited network. And, a payment using the payment means can also be made through a communication network corresponding to the received payment means, namely, a communication network of a specific bank or credit card company. In this instance, information related to a currently-located country of the mobile terminal 100 and information related to services and benefits of the specific payment means involved in the corresponding country may also be received through the communication network of the specific bank or credit card company. Also, the specific payment means may automatically be registered as a main payment means.

The description of FIG. 4 has given of the example in which the mobile terminal 100 identifies the currently-located country and the visited network using the TAI information included in the ATTACH ACCEPT message. However, the identification may alternatively be carried out using other information.

For example, the controller 180 of the mobile terminal 100 disclosed herein may receive globally unique temporary identifier (GUTI) information along with the ATTACH ACCEPT message, in response to the ATTACH REQUEST message. Here, the GUTI information may refer to temporary identification information related to the UE 100 which can be used in A currently-accessed visited network. In this instance, the UE 100 may perform communication with the MME of the visited network using the GUTI information.

Meanwhile, the GUTI information may include PLMN ID information, and GUMMEI including MME identification information (MMEI; MME identifier). Accordingly, the controller 180 may identify a country that the mobile terminal 100 is currently located and a visited network using the PLMN ID included in the GUTI information.

Hereinafter, effects provided by the mobile terminal and the control method thereof will be described.

In accordance with at least one of embodiments disclosed herein, at least one of a plurality of payment means included in the mobile terminal can be recommended to a user based on a currently-located country of the mobile terminal, such that the user can select a payment means more appropriate to be available in the country where the user is visiting in an easier and more convenient manner.

In accordance with at least one of embodiments disclosed herein, benefit information related to each of the plurality of payment means, involved in the currently-located country of the mobile terminal can be output to facilitate the user to select a payment means providing more benefits in the country where the user is visiting.

In accordance with at least one of embodiments disclosed herein, when the mobile terminal accesses a visited network due to overseas roaming, the currently-located country of the mobile terminal can be identified based on information received from the visited network. This may allow for outputting a payment means appropriate to be available in the currently-visited country of the user even without using a positioning method or positioning modules.

The subject matter described in this application can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a memory device that is configured to store a plurality of payment means;
a communication unit that is configured to receive network identification information from an accessed communication network;
a display unit for outputting image information; and
a controller that is configured to:
identify, from the received network identification information, a country where the mobile terminal is located based on a communication network identified from the network identification information being a visited network,
output at least one of the plurality of payment means as an available payment means, the at least one of the plurality of payment means having a same brand as a card association brand that is accepted in the identified country;
detecting overseas roaming of the mobile terminal by comparing the received network identification information and a stored home network identification information,
when the overseas roaming is detected, detect, from among the plurality of payment means, at least one of the payment means having the same brand as the card association brand used in the identified country,
display roaming notification information that indicates the detected overseas roaming, and
in response to a user selection of the roaming notification information, display a payment means selection menu in which the detected payment means that has the same brand as the card association brand used in the identified country is distinguished from other payment means.

2. The mobile terminal of claim 1, wherein the controller is further configured to output, on the display unit of the mobile terminal, service information related to the identified country for each of the plurality of payment means,
wherein the service information includes information related to a clearing commission, a discount rate, and a point accumulation rate for the identified country and for each of the plurality of payment means.

3. The mobile terminal of claim 2, wherein the service information further includes information related to a type of each of the plurality of payment means,
wherein the information related to the type of each of the plurality of payment means includes information indicating whether the payment method is a credit card or a debit card.

4. The mobile terminal of claim 3, wherein the controller is further configured to output account information related to an account linked to the debit card according to a user selection based on the payment method being the debit card,
wherein the account information includes bank balance information related to the linked account.

5. The mobile terminal of claim 2, wherein the service information further includes event information related to the identified country and benefit information related to an event for each payment method.

6. The mobile terminal of claim 1, wherein the controller is further configured to:
register, as a main payment method, one of the at least one of the plurality of payment means according to a preset criterion, the at least one of the plurality of payment means having a same brand as a card association brand accepted in the identified country, and
make a payment via the payment method that is registered as the main payment method, in response to a payment request,
wherein the preset criterion is a clearing commission, a discount rate, or a point accumulation rate for a reference amount of spent money.

7. The mobile terminal of claim 6, wherein:
the preset criterion further includes currencies accepted in the identified country and associated exchange rates, and
the controller is further configured to compare the clearing commission for each payment method based on a currency with a lowest exchange rate among the currencies accepted in the identified country.

8. The mobile terminal of claim 6, wherein the controller is further configured to:
request, from a mobility management entity (MME) of a currently-accessed communication network, information related to card association brands that are accepted in the visited network, and
set, as the main payment method, a payment method that has the same brand as a specific card association brand among the plurality of payment means based on information related to the specific card association brand that is received from the mobility management entity.

9. The mobile terminal of claim 6, wherein the controller is further configured to:
register at least one additional payment method as a main payment method based on a discount rate, a point accumulation rate, or a clearing commission based on a specific region or a specific amount of money being set, and make a payment via the additional payment method based on a payment-requested region being located within the specific region or based on a total amount of spent money or a payment-requested amount of money being more than the specific amount of money.

10. The mobile terminal of claim 6, wherein the controller is further configured to:
store information related to a main payment method before changing the main payment method according to the registration of the main payment method, and
recover the main payment method using the stored information based on a communication network identified from network identification information received through an accessed communication network being a home network.

11. The mobile terminal of claim 1, wherein the controller is further configured to identify the country where the mobile terminal is located based on location information acquired from at least one positioning module, when the network identification information is not obtained from the currently-accessed communication network,
wherein the at least one positioning module is a global positioning system (GPS) module, a WiFi module, or at least one peripheral that is configured to connect to the mobile terminal.

12. The mobile terminal of claim 1, wherein the controller is further configured to output, as an unavailable payment method, a payment method of the plurality of payment means that has an expiration date that is within a predetermined period.

13. The mobile terminal of claim 12, wherein the controller is further configured to:
estimate a period of an overseas stay of a user based on information stored in the mobile terminal, and
output, as the unavailable payment method, a payment method of the plurality of payment means that has an expiration date that is during in the estimated period of overseas stay,
wherein the information stored in the mobile terminal includes schedule information or airline ticket purchase history information.

14. The mobile terminal of claim 1, wherein the controller is further configured to:
search for an available payment method of the plurality of payment means according to a preset criterion, and
notify a user to an absence of the available payment method by outputting, on a display unit, notification information based on indicator information related to a current state of the mobile terminal being output, based on an image of a preset main payment method being output, or based on a distance between the mobile terminal and a preset peripheral being within a predetermined distance.

15. The mobile terminal of claim 14, wherein the controller is further configured to output information related to an issue of another payment method based on there being no available payment means in the plurality of payment means,
wherein the information related to the issue of the other payment method includes:
information related to at least one payment method having the same brand as a card association brand that is accepted in a country where the mobile terminal is located or a visited network that the mobile terminal is currently accessing,
service information that includes a clearing commission of the at least one payment method, and
benefit information that includes a discount rate and a point accumulation rate of the at least one payment method.

16. The mobile terminal of claim 14, wherein the controller is further configured to output information for guiding the user to change settings of at least one of the plurality of payment means based on there not being any available payment means in the plurality of payment means.

17. The mobile terminal of claim 1, wherein the controller is further configured to receive the network identification information through (i) a track area identifier (TAI) list that is included in an attach accept message received from a mobile management entity of an accessed communication network upon the mobile terminal initially accessing the accessed communication network or (ii) a tracking area update (TAU) accept message received from the mobile management entity upon a movement of the mobile terminal.

18. The mobile terminal of claim 17, wherein identifying the country where the mobile terminal is located is further based on a mobile country code (MCC) or a mobile network code (MNC) included in the network identification information.

19. The mobile terminal of claim 1, wherein the controller is further configured to:
request, from the visited network, information of a payment method available in the visited network based on accessing the visited network, and
acquire information related to a specific payment method through a communication network associated with the specific payment method based on information of the specific payment method being received in response to the request.

20. The mobile terminal of claim 1, wherein the network identification information is a Public Land Mobile Network ID.

21. A method for controlling a mobile terminal, the method comprising:
receiving network identification information ((PLMN (Public Land Mobile Network) ID)) from an accessed communication network;
detecting overseas roaming of the mobile terminal by comparing the received network identification information and stored home network identification information;
identifying a country according to a location of the mobile terminal based on the received network identification information based on detecting the overseas roaming;
outputting, as an available payment means, at least one payment means of a plurality of payment means that are prestored in the mobile terminal, the at least one payment means having a same brand as a card association brand that is accepted in the identified country,
wherein outputting the available payment means further comprises:
detecting, among the prestored plurality of payment means, at least one of the payment means having the same brand as the card association brand used in the identified country;
displaying roaming notification information that indicates the detected overseas roaming; and
in response to a user selection of the roaming notification information, displaying a payment means selection menu in which the detected payment means having the same brand as the card association brand used in the identified country is distinguished from other payment means, in response to the user input to the roaming notification information.

\* \* \* \* \*